United States Patent
Zangi et al.

(10) Patent No.: US 8,432,993 B2
(45) Date of Patent: Apr. 30, 2013

(54) USING SPATIAL PROPERTIES OF MIMO CHANNELS FOR ENHANCED CHANNEL ESTIMATION IN MIMO SYSTEMS

(75) Inventors: Kambiz Zangi, Chapel Hill, NC (US); Leonid Krasny, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 153 days.

(21) Appl. No.: 12/810,360

(22) PCT Filed: Dec. 27, 2007

(86) PCT No.: PCT/SE2007/051084
§ 371 (c)(1),
(2), (4) Date: Jun. 24, 2010

(87) PCT Pub. No.: WO2009/084990
PCT Pub. Date: Jul. 9, 2009

(65) Prior Publication Data
US 2010/0272207 A1    Oct. 28, 2010

(51) Int. Cl.
*H04B 7/02* (2006.01)
(52) U.S. Cl.
USPC ............................ 375/267; 375/316; 375/295
(58) Field of Classification Search .................. 375/260, 375/267, 295, 316; 370/206, 329, 338, 342, 370/480
See application file for complete search history.

(56) References Cited

U.S. PATENT DOCUMENTS

| | | | |
|---|---|---|---|
| 6,424,642 B1* | 7/2002 | Schmidl et al. | 370/342 |
| 7,072,315 B1* | 7/2006 | Liu et al. | 370/329 |
| 7,672,389 B2* | 3/2010 | Gueguen | 375/267 |
| 7,885,228 B2* | 2/2011 | Walton et al. | 370/329 |
| 2002/0181509 A1* | 12/2002 | Mody et al. | 370/480 |
| 2006/0088115 A1* | 4/2006 | Chen et al. | 375/260 |
| 2007/0177688 A1* | 8/2007 | Wu et al. | 375/267 |
| 2007/0280175 A1* | 12/2007 | Cheng et al. | 370/338 |
| 2008/0253279 A1* | 10/2008 | Ma et al. | 370/206 |

FOREIGN PATENT DOCUMENTS

EP    1821445 A1    8/2007

OTHER PUBLICATIONS

Wallace, J. W. et al. "Accurate MIMO Channel Modeling: Correlation Tensor vs. Directional Approaches." 2007 IEEE Global Telecommunications Conference, Nov. 26-30, 2007, pp. 3750-3754.
Weichselberger, W. "On the Decomposition of the MIMO Channel Correlation Tensor." ITG Workshop, Mar. 18-19, 2004, pp. 268-273.
Weis, M. et al. "A Correlation Tensor-Based Model for Time Variant Frequency Selective MIMO Channels." WSA Workshop on Smart Antennas, Feb. 2007.

* cited by examiner

*Primary Examiner* — Daniel Washburn
*Assistant Examiner* — Fitwi Hailegiorgis
(74) *Attorney, Agent, or Firm* — Coats & Bennett, P.L.L.C.

(57) ABSTRACT

An apparatus for estimating a channel response associated with a multiple input/multiple output (MIMO) system includes an antenna that receives multiple pilot symbols, each of the multiple pilot symbols transmitted from a different one of multiple transmit antennas of a transmitter in the MIMO system. The apparatus further includes a channel estimator that determines spatial, time and frequency correlations of channels of the MIMO system among the multiple transmit antennas when estimating a channel response associated with the MIMO system based on multiple ones of the received plurality of pilot symbols.

22 Claims, 19 Drawing Sheets

USING SPATIAL PROPERTIES OF MIMO CHANNELS FOR ENHANCED CHANNEL ESTIMATION IN MIMO SYSTEMS

TECHNICAL FIELD

Implementations described herein relate generally to channel estimation in wireless systems.

BACKGROUND

Ideally, a radio frequency (RF) signal received by a receiver in a wireless communication system precisely matches the RF signal transmitted by the transmitter. In real world situations, however, the transmitted RF signals are distorted due to the response of the channel that carries the RF signals. For example, transmit power levels, distance, multipath effects, etc. may affect the channel response which, in turn, may affect the transmitted RF signals.

To recreate the data contained in the transmitted RF signals, a typical receiver includes a channel estimator that attempts to reverse the adverse effects of the channel response upon the transmitted RF signals. This channel estimator is typically trained using known data, called pilot symbols, which are inserted into the RF signals. The recreated data may be evaluated with respect to the known data to determine an estimate of the channel response. The channel response estimate may be used to attempt to accurately recreate the data contained in subsequently transmitted RF signals.

SUMMARY

Exemplary embodiments described herein perform pilot-assisted channel estimation in a multiple input/multiple output (MIMO) system, having $N_{tx}$ transmit antennas and $N_{rx}$ receive antennas, that exploits the correlation among the different transmit antennas to improve the channel estimation accuracy. In particular, exemplary embodiments take advantage of the high spatial correlation that can exist between the MIMO channels, such as, for example, in MIMO systems with beamforming, where the distance between transmit antennas may be small (e.g., ~0.5λ, where λ is the wavelength). Where the distance between transmit antennas in the MIMO system is small, the MIMO channels are highly spatially correlated and the channel estimation in such a system can be improved by taking into account the spatial properties of the MIMO channels. Taking into account the spatial properties of the MIMO channels may include estimating channel responses based on multiple received pilot symbols, where each of the received pilot symbols is transmitted from a different transmit antenna of multiple transmit antennas of a transmitter in a MIMO system, and based on correlations of each of the MIMO channels in the space, time and frequency domain.

According to one aspect, an apparatus for estimating a channel response associated with a multiple input/multiple output (MIMO) system may include an antenna configured to receive multiple pilot symbols, each of the multiple pilot symbols transmitted from a different one of multiple transmit antennas of a transmitter in the MIMO system. The apparatus may further include a channel estimator configured to determine spatial, time and frequency correlations of channels of the MIMO system among the multiple transmit antennas when estimating a channel response associated with the MIMO system based on multiple ones of the received multiple pilot symbols.

According to a further aspect, a method for estimating a channel response associated with a multiple input/multiple output (MIMO) system may include receiving multiple pilot symbols at a receiver, each of the multiple pilot symbols transmitted from a different one of multiple transmit antennas of a transmitter in the MIMO system. The method may further include determining spatial, time and frequency correlations of channels of the MIMO system among the multiple transmit antennas and estimating (1450) a first channel response associated with a first channel of the MIMO system based on the spatial, time and frequency correlations and multiple ones of the received multiple pilot symbols.

According to another aspect, a channel estimator, implemented in a mobile terminal or a base station of a wireless network, for estimating channel responses associated with channels of a multiple input/multiple output (MIMO) system may include an antenna for receiving multiple pilot symbols, each of the multiple pilot symbols transmitted from a different one of multiple transmit antennas of a transmitter in a multiple input/multiple output (MIMO) system. The channel estimator may further include means for estimating a channel response associated with a first channel of the MIMO system based on multiple ones of the received multiple pilot symbols and means (920) for estimating a channel response associated with a second channel of the MIMO system based on multiple ones of the received multiple pilot symbols.

According to yet another aspect, a method, implemented in a mobile terminal or a base station of a wireless network, for estimating a channel response associated with a first channel of a multiple input/multiple output (MIMO) system, may include receiving multiple pilot symbols at an antenna of a receiver, each of the multiple pilot symbols transmitted from a different one of multiple transmit antennas of a transmitter in the MIMO system. The method may further include obtaining distances between each of the transmit antennas of the multiple transmit antennas and estimating the channel response based on the determined distances and on multiple ones of the received multiple pilot symbols. The method may also include using (1460) the estimated channel response for decoding subsequent symbols received via the first channel at the antenna.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Figure 1A:
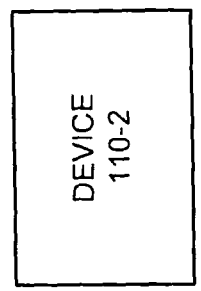
FIG. 1A illustrates two devices communicating with one another in a network.
Figure 1A:
Figure 1A:
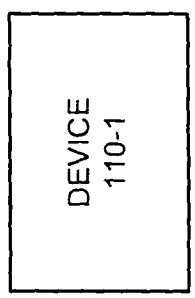

FIG. 1A illustrates two devices communicating with one another in a network 100. As shown in FIG. 1, a device 110-1 may communicate with another device 110-2 via a wireless link in network 100. In one implementation, devices 110-1 and 110-2 may include wireless devices in an ad-hoc network. In another implementation, device 110-1 may communicate with another device via device 110-2 that acts as an intermediate device between device 110-1 and the other device. For example, as shown in FIG. 1B, device 110-2 may reside as an intermediate component of a network 120 that may be used to facilitate end-to-end communication between device 110-1 and another device 110-3.

Each of devices 110-1, 110-2 and 110-3 may include a mobile terminal such as a cellular radiotelephone, a personal digital assistant (PDA), a Personal Communications Systems (PCS) terminal, a laptop computer, a palmtop computer, or any other type of device or appliance that includes a communication transceiver that permits the device to communicate with other devices via a wireless link. A PCS terminal may combine a cellular radiotelephone with data processing, facsimile and data communications capabilities. A PDA may include a radiotelephone, a pager, Internet/intranet access, a web browser, an organizer, calendars and/or a global positioning system (GPS) receiver. One or more of devices 110-1, 110-2 and 110-3 may be referred to as a "pervasive computing" device. Device 110-2 may, in one implementation, include a base station of a Public Land Mobile Network (PLMN).

Network(s) 120 may include one or more networks of any type, including a local area network (LAN); a wide area network (WAN); a metropolitan area network (MAN); a telephone network, such as the Public Switched Telephone Network (PSTN) or a PLMN; a satellite network; an intranet, the Internet; or a combination of networks. The PLMN(s) may further include a packet-switched network, such as, for example, General Packet Radio Service (GPRS), Cellular Digital Packet Data (CDPD), or Mobile IP network.

Figure 1B:
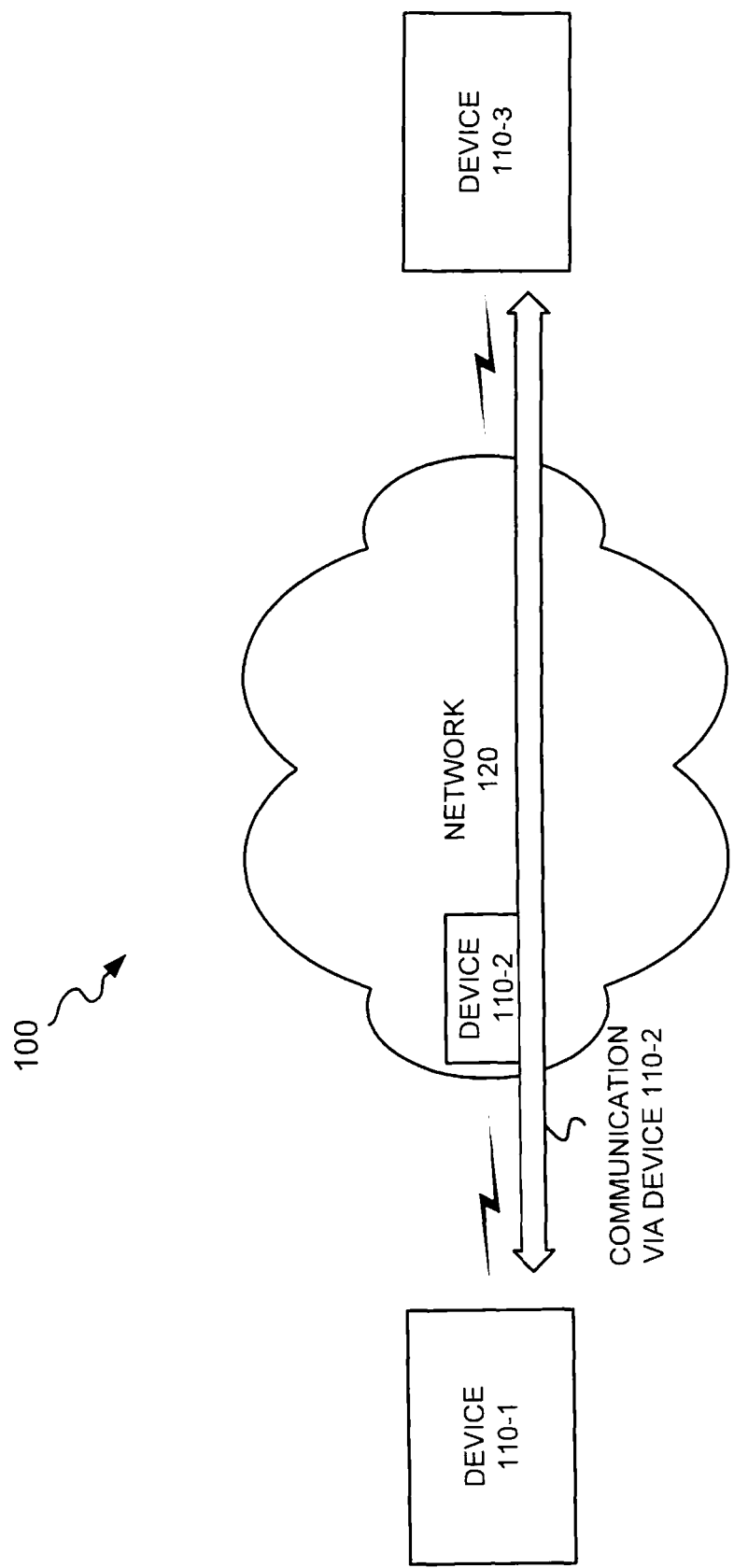
FIG. 1B illustrates an exemplary implementation in which one of the two devices of FIG. 1A is used as an intermediate device to facilitate communication with another device in the network.
Figure 2:
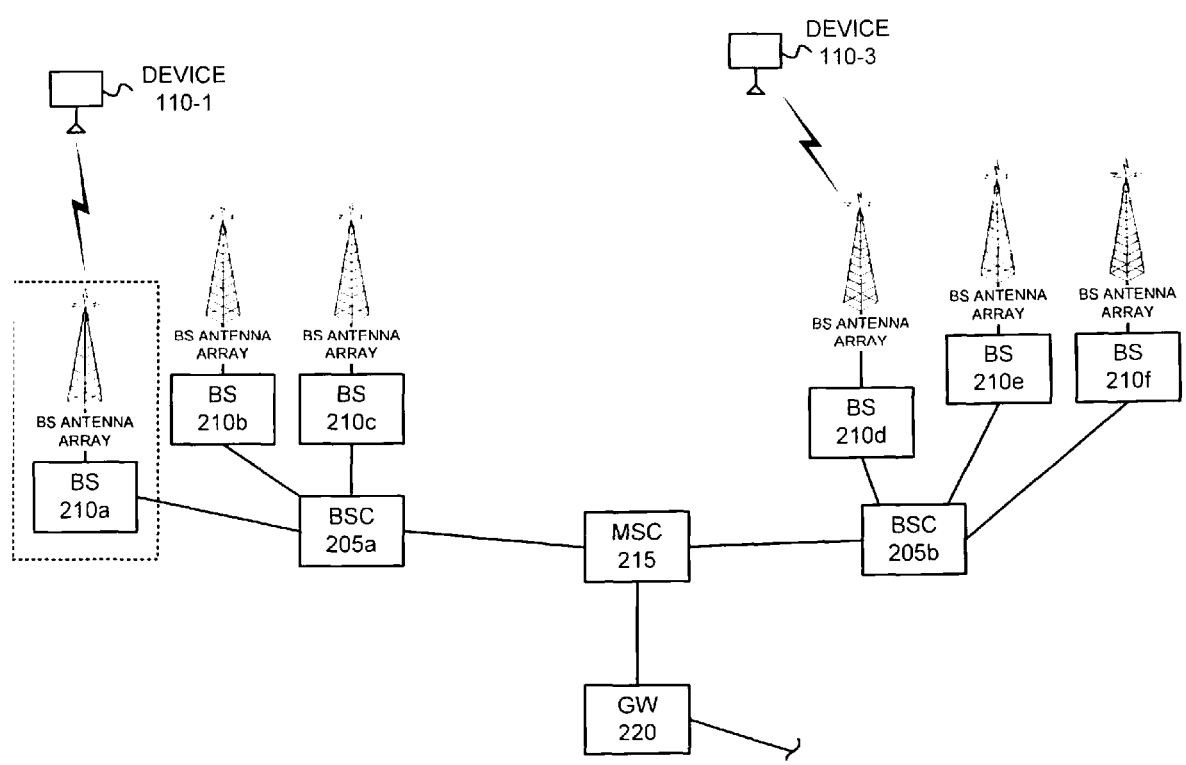
FIG. 2 illustrates an exemplary implementation in which a base station in a mobile network acts as an intermediate device to enable a mobile terminal to communicate with another mobile terminal or other communications device.

FIG. 2 illustrates an example of the exemplary implementation of FIG. 1B, where network 120 includes a PLMN 200. As shown in FIG. 2, device 110-2 may include a base station of the PLMN 200 and devices 110-1 and 110-3 may include cellular radiotelephones that are communicating with one another via PLMN 200.

PLMN 200 may include one or more base station controllers (BSCs) 205a-205b, multiple base stations (BSs) 210a-210f along with their associated antenna arrays, one or more mobile switching centers (MSCs), such as MSC 215, and one or more gateways (GWs), such as GW 220.

Base stations 210a-210f may format the data transmitted to, or received from, the antenna arrays in accordance with existing techniques and may communicate with BSCs 205a-205b or a device, such as device 110-1. Among other functions, BSCs 205a-205b may route received data to either MSC 215 or a base station (e.g., BSs 210a-210c or 210d-210f), MSC 215 may route received data to BSC 205a or 205b, GW 220 may route data received from an external domain (not shown) to an appropriate MSC (such as MSC 215), or from an MSC to an appropriate external domain. For example, the external domain may include the Internet or a PSTN.

Figure 3A:
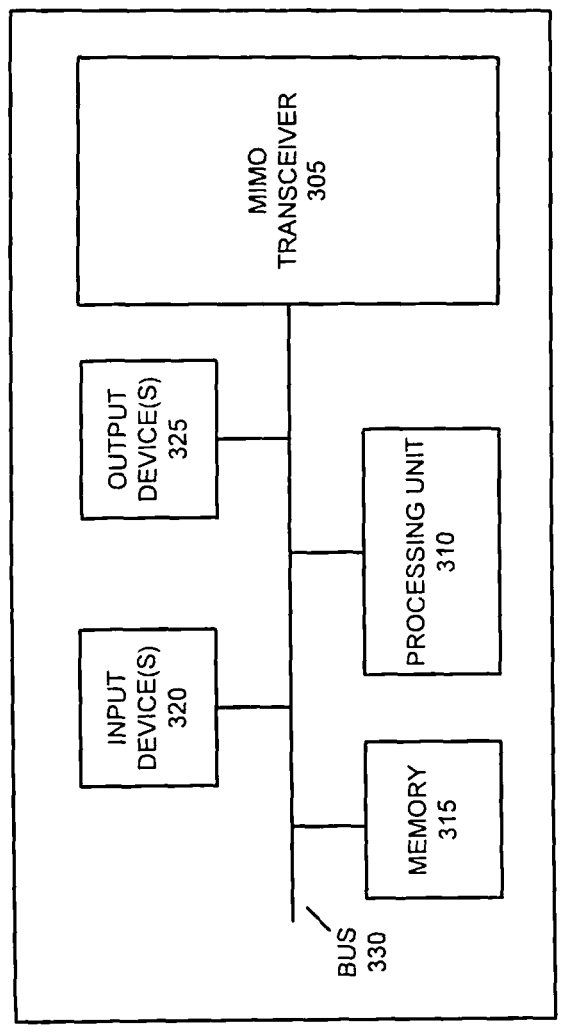
FIG. 3A illustrates exemplary components of a device of FIG. 1A.

FIG. 3A illustrates device 110-1 consistent with an exemplary embodiment. Device 110-3 may be similarly configured. Device 110-1 may include a MIMO transceiver 305, a processing unit 310, a memory 315, an input device(s) 320, an output device(s) 325, and a bus 330.

MIMO transceiver 305 may include transceiver circuitry for transmitting and/or receiving symbol sequences using radio frequency signals via multiple antennas (not shown). Processing unit 310 may include a processor, microprocessor, or processing logic that may interpret and execute instructions. Processing unit 310 may perform all data processing functions for inputting, outputting, and processing of data including data buffering and device control functions, such as call processing control, user interface control, or the like.

Memory 315 may provide permanent, semi-permanent, or temporary working storage of data and instructions for use by processing unit 310 in performing device processing functions. Memory 315 may include read only memory (ROM), random access memory (RAM), large-capacity storage devices, such as a magnetic and/or optical recording medium and its corresponding drive, or other types of memory devices. Input device(s) 320 may include mechanisms for entry of data into device 110-1. For example, input device(s) 320 may include a key pad (not shown), a microphone (not shown) or a display unit (not shown). The key pad may permit manual user entry of data into device 110-1. The microphone can include mechanisms for converting auditory input into electrical signals. The display unit may include a screen display that may provide a user interface (e.g. a graphical user interface) that can be used by a user for selecting device functions. The screen display of the display unit may include any type of visual display, such as, for example, a liquid crystal display (LCD), a plasma screen display, a light-emitting diode (LED) display, a cathode ray tube (CRT) display, an organic light-emitting diode (OLED) display, etc.

Output device(s) 325 may include mechanisms for outputting data in audio, video and/or hard copy format. For example, output device(s) 350 may include a speaker (not shown) that includes mechanisms for converting electrical signals into auditory output. Output device(s) 325 may further include a display unit that displays output data to the user. For example, the display unit may provide a graphical user interface that displays output data to the user. Bus 330 may interconnect the various components of device 110-1 to permit the components to communicate with one another.

The configuration of components of device 110-1 illustrated in FIG. 3A is for illustrative purposes only. Other configurations with more, fewer, or a different arrangement of components may be implemented.

Figure 3B:
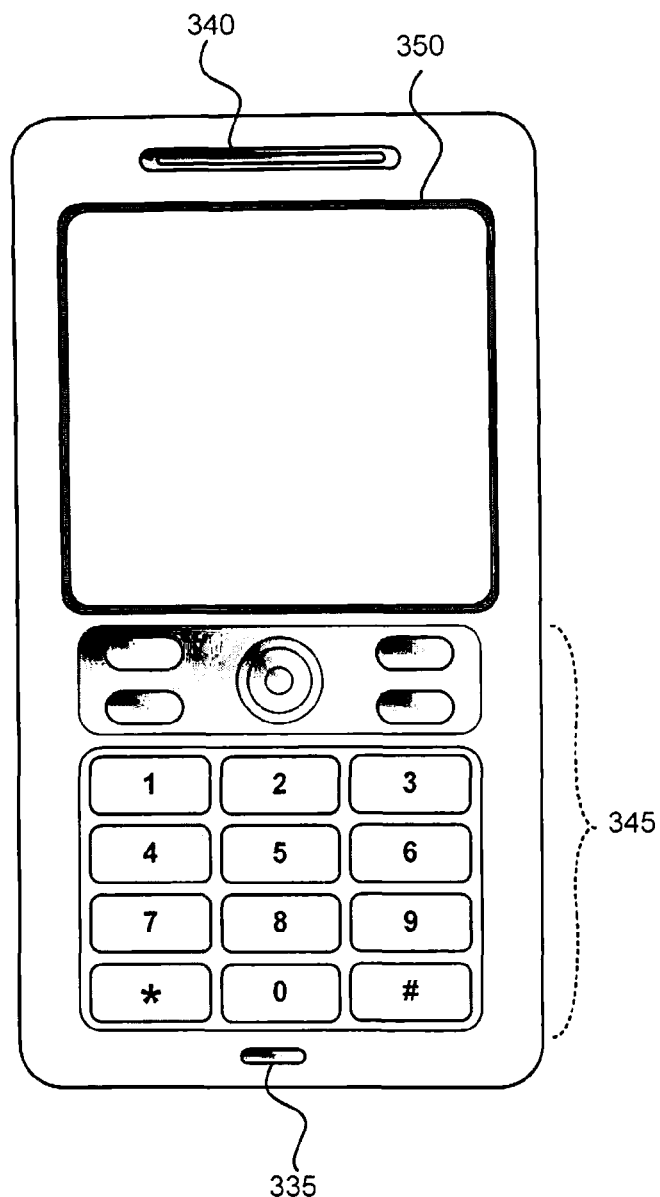
FIG. 3B illustrates an exemplary implementation of a device of FIG. 1A where the device is a cellular radiotelephone.

FIG. 3B illustrates an exemplary implementation of device 110-1 in which device 110-1 is a cellular radiotelephone. As shown in FIG. 3B, the cellular radiotelephone may include a microphone 335 (e.g., of input device(s) 320) for entering audio information into device 110-1, a speaker 340 (e.g. of output device(s) 325) for providing an audio output from device 110-1, a keypad 345 (e.g., of input device(s) 320) for manual entry of data or selection of device functions, and a display 350 (e.g. of input device(s) 320 or output device(s) 325) that may visually display data to the user or which may provide a user interface that the user may use to enter data or to select device functions (in conjunction with keypad 345).

Figure 4:
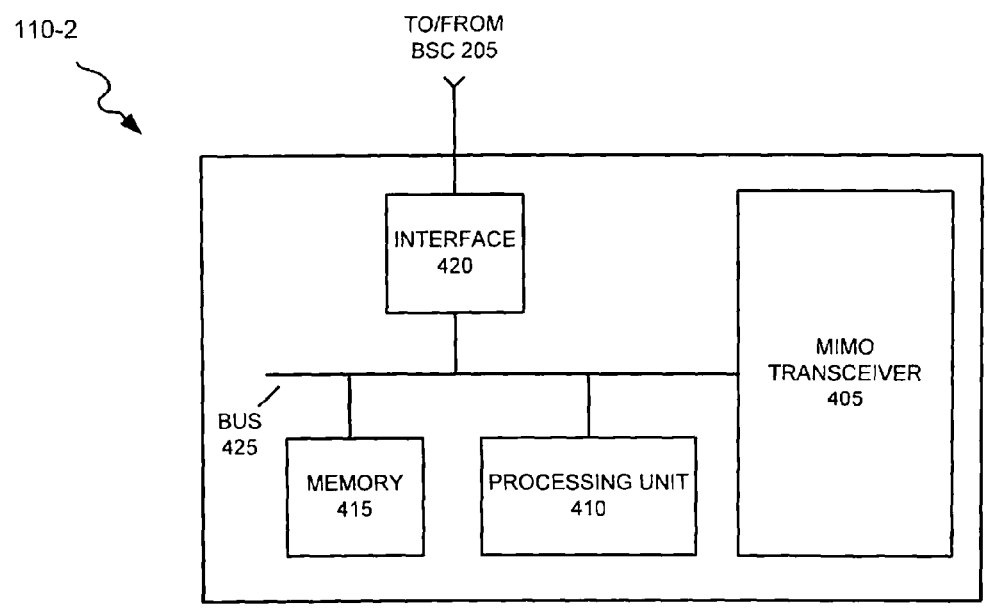
FIG. 4 illustrates exemplary components of the base station of FIG. 2.

FIG. 4 illustrates one exemplary implementation of device 110-2 in which device 110-2 includes a base station of PLMN 200. Device 110-2 may include a MIMO transceiver 405, a processing unit 410, a memory 415, an interface 420 and a bus 425.

MIMO transceiver 405 may include transceiver circuitry for transmitting and/or receiving symbol sequences using radio frequency signals via multiple antennas (not shown). Processing unit 410 may include a processor, microprocessor, or processing logic that may interpret and execute instructions. Processing unit 410 may perform all device data processing functions. Memory 415 may provide permanent, semi-permanent, or temporary working storage of data and instructions for use by processing unit 410 in performing device processing functions. Memory 415 may include read only memory (ROM), random access memory (RAM), large-capacity storage devices, such as a magnetic and/or optical recording medium and its corresponding drive, or other types of memory devices. Interface 420 may include circuitry for interfacing with a link that connects to a BSC (e.g., BSC 205a or BSC 205b). Bus 425 may interconnect the various components of device 110-2 to permit the components to communicate with one another.

The configuration of components of device 110-2 illustrated in FIG. 4 is for illustrative purposes only. Other configurations with more, fewer, or a different arrangement of components may be implemented.

Figure 5:
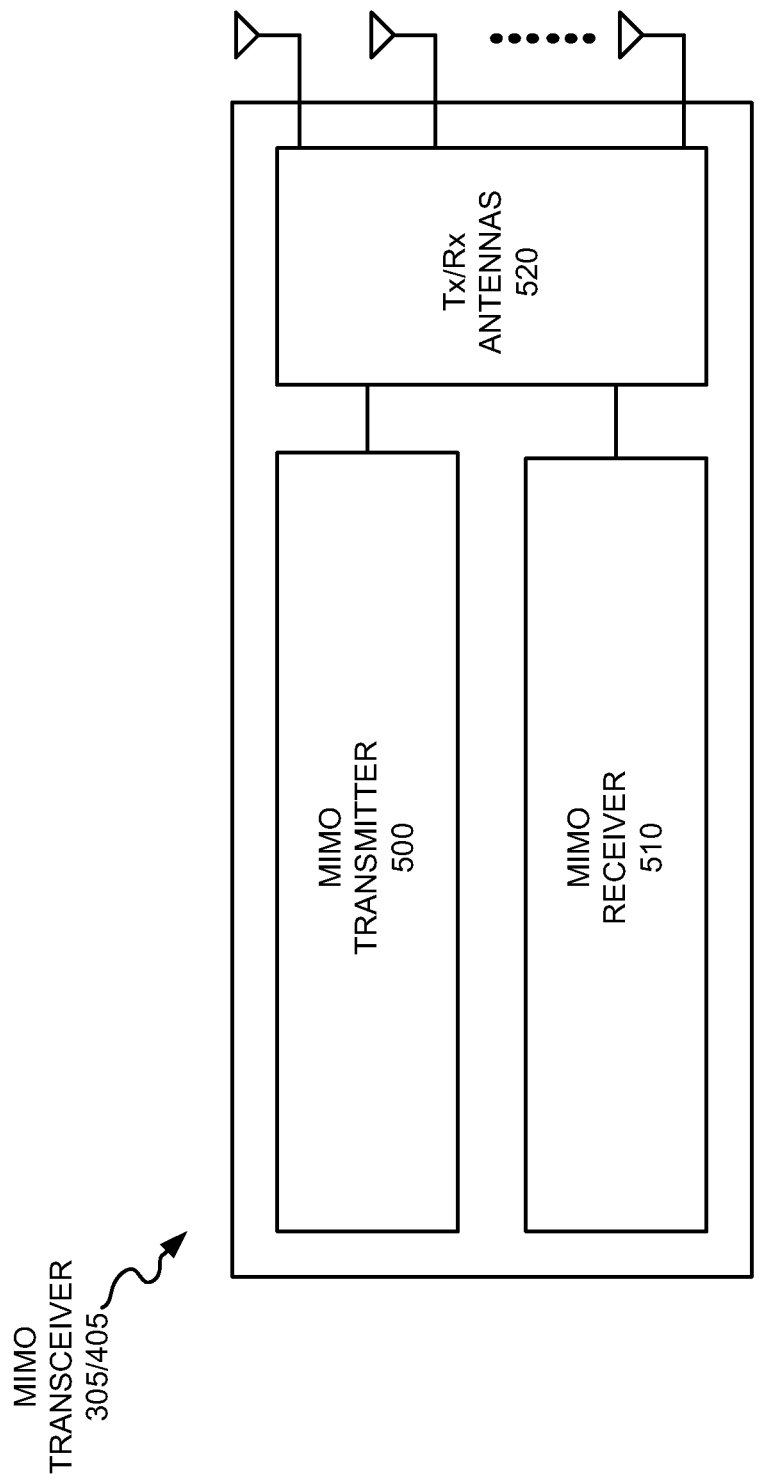
FIG. 5 illustrates an exemplary multiple input/multiple output (MIMO) transceiver.

FIG. 5 is a diagram of exemplary components of MIMO transceivers 305 or 405 according to an exemplary implementation. MIMO transceiver 305 or 405 may include a MIMO transmitter 500, a MIMO receiver 510 and transmit (Tx)/receive (Rx) antennas 520.

MIMO transmitter 500 may include circuitry for transmitting symbols over RF channels via multiple antennas. Further exemplary details of MIMO transmitter 500 are described below with respect to FIG. 6. MIMO receiver 510 may include circuitry for receiving symbols over RF channels via multiple antennas. Further exemplary details of MIMO receiver 510 are described below with respect to FIG. 8. Tx/Rx antennas 520 may include multiple antennas, and their associated circuitry, for receiving symbols transmitted via RF channels and providing the received symbols to MIMO receiver 510 and for transmitting symbols, via RF channels, that are received from MIMO transmitter 500.

Figure 6:
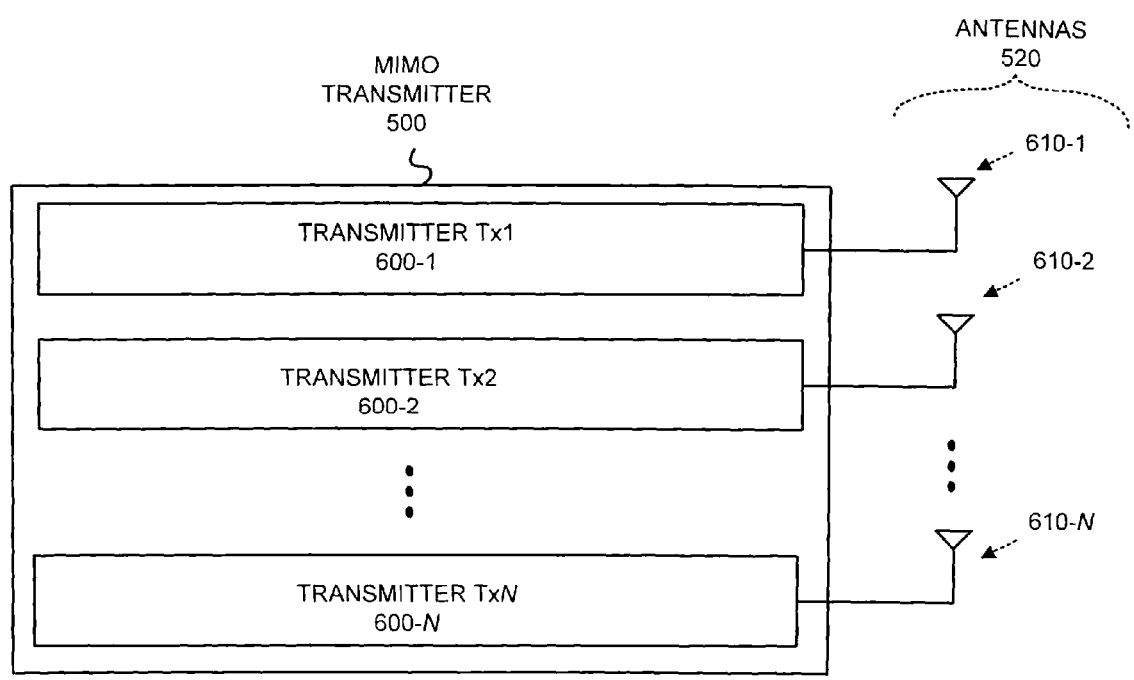
FIG. 6 illustrates an exemplary MIMO transmitter and connected antennas.

FIG. 6 is a diagram of MIMO transmitter 500 according to an exemplary implementation. MIMO transmitter 500 may include multiple transmitter units 600-1 through 600-N (collectively referred to herein as "transmitters 600" or generically and individually referred to herein as "transmitter 600-x"), each connected to a respective one of antennas 610-1 through 610-N (generically and individually referred to herein as "antenna 610-x") of antennas 520.

Figure 7:
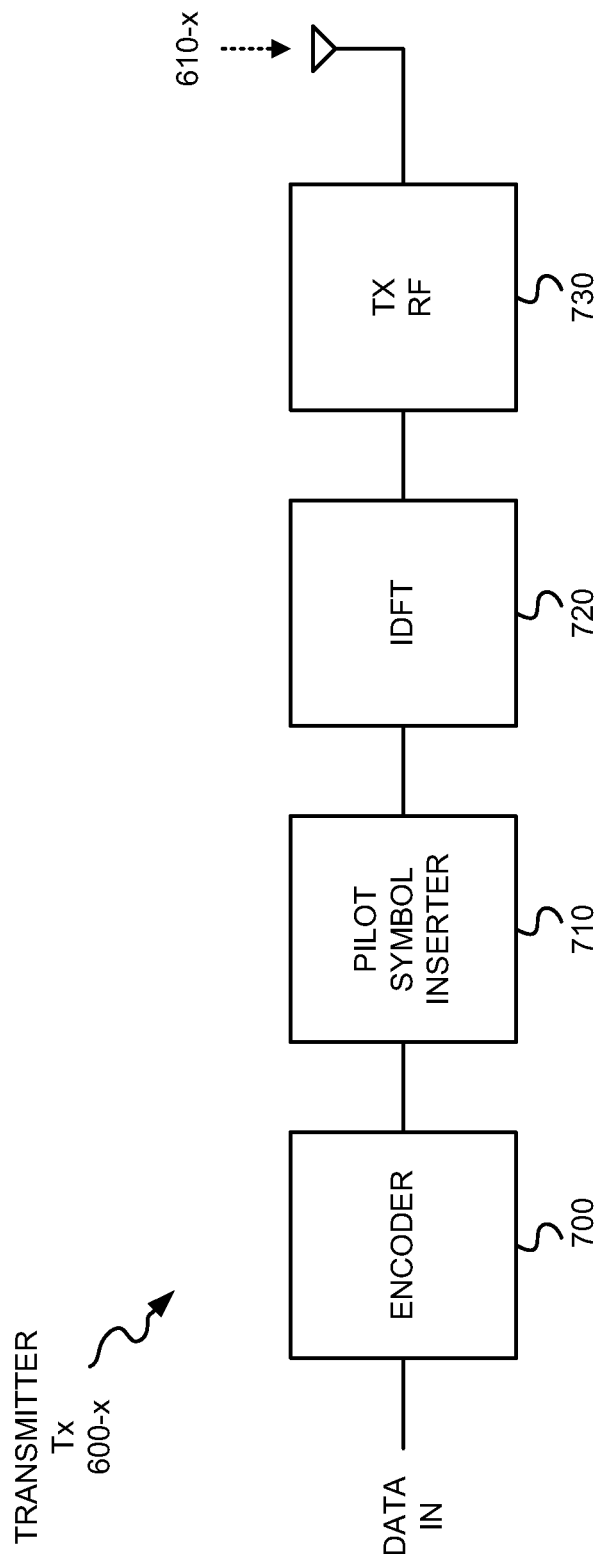
FIG. 7 illustrates an exemplary transmitter unit of the MIMO transmitter of FIG. 6.

As further shown in FIG. 7, each transmitter 600-x may include an encoder 700, a pilot symbol inserter 710, an inverse discrete Fourier Transform (IDFT) unit 720, transmitter RF circuitry 730, and an antenna 610-x. Encoder 700 may include a device for converting an input data stream into a stream of coded symbols. Pilot symbol inserter 710 may insert multiple pilot symbols into the symbol stream that is output from encoder 700. IDFT unit 720 may include functionality for performing an inverse discrete Fourier transform upon the input symbol stream. Transmitter RF circuitry 730 may include circuitry for transmitting the output of IDFT 720 as RF signals via antenna 610-x. Each transmitter 600-x may include more, fewer, or different components than those shown in FIG. 7.

Figure 8:
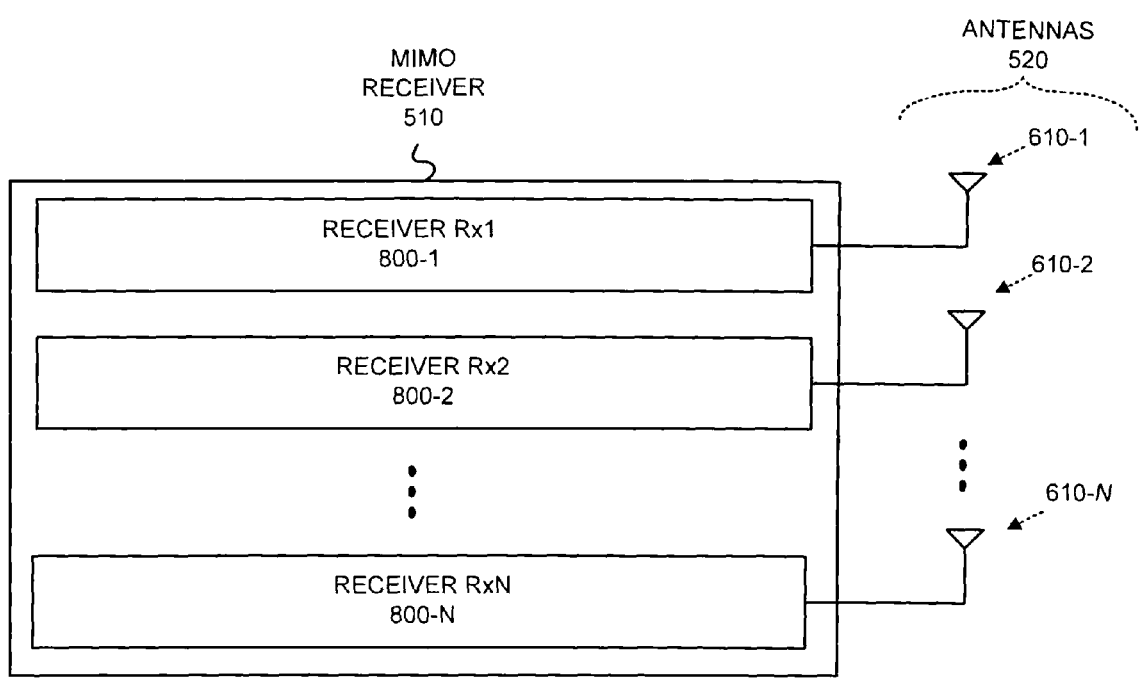
FIG. 8 illustrates an exemplary MIMO receiver and connected antennas.

FIG. 8 is a diagram of MIMO receiver 510 according to an exemplary implementation. As shown in FIG. 8, MIMO receiver 510 may include receiver units 800-1 through 800-N (collectively referred to herein as "receivers 800" or generically and individually referred to herein as "receiver 800-x"), each connected to a respective one of antennas 610-1 through 610-N of antennas 520.

Figure 9:
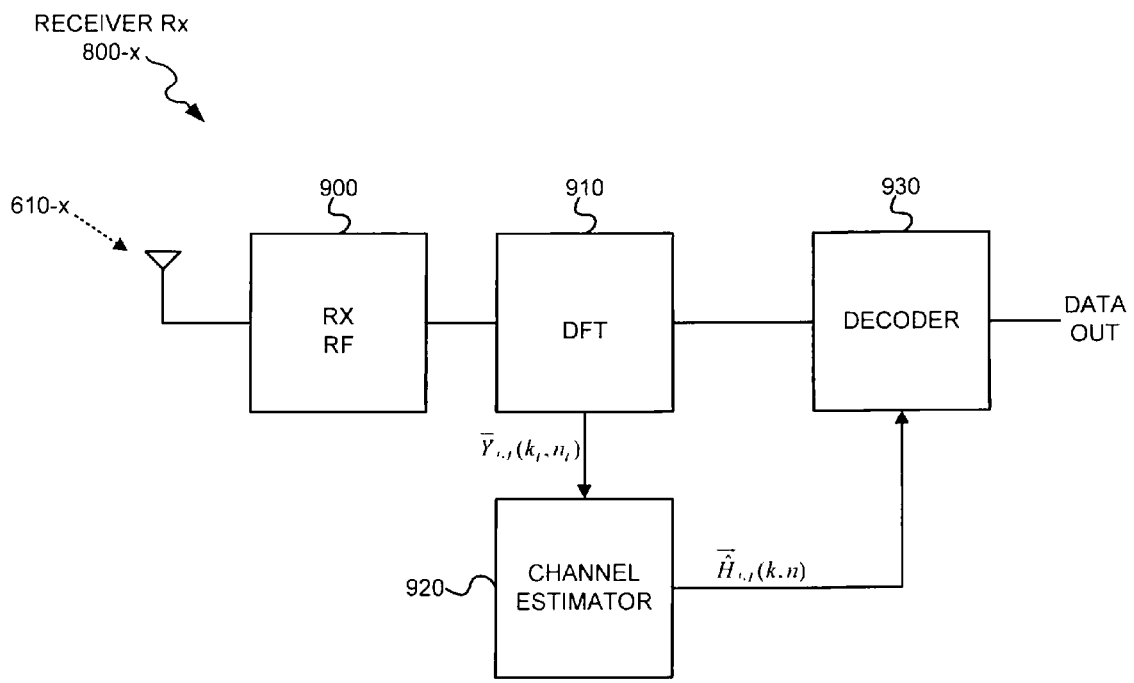
FIG. 9 illustrates an exemplary receiver unit of the MIMO receiver of FIG. 8.

As further shown in FIG. 9, each receiver 800-x may include receiver RF circuitry 900, a DFT unit 910, a channel estimator 920 and a decoder 930. RF circuitry 900 may include circuitry for receiving the transmitted RF signals from antenna 610-x and providing the RF signals to DFT unit 910. RF circuitry 900 may include, for example, an analog-to-digital converter (ADC) that may convert an analog RF signal to a digital representation of the signal. DFT unit 910 may include functionality for performing a discrete Fourier transform upon the output from RF circuitry 900. DFT unit 910 may provide the received signals $\overline{Y}_{i,j}(k_l, n_l)$, that correspond to the pilot symbols transmitted across the MIMO channels, to channel estimator 920. Channel estimator 920 may, in turn, provide a channel estimation vector $\vec{H}_{i,j}(k,n)$ that may be used by decoder 930 to properly decode a subsequently received sequence of symbols in spite of the distortion to the received sequence of symbols caused by the channel response of the respective MIMO channel. Each receiver 800-x may include more, fewer, or different components than those shown in FIG. 9.

Figure 10:
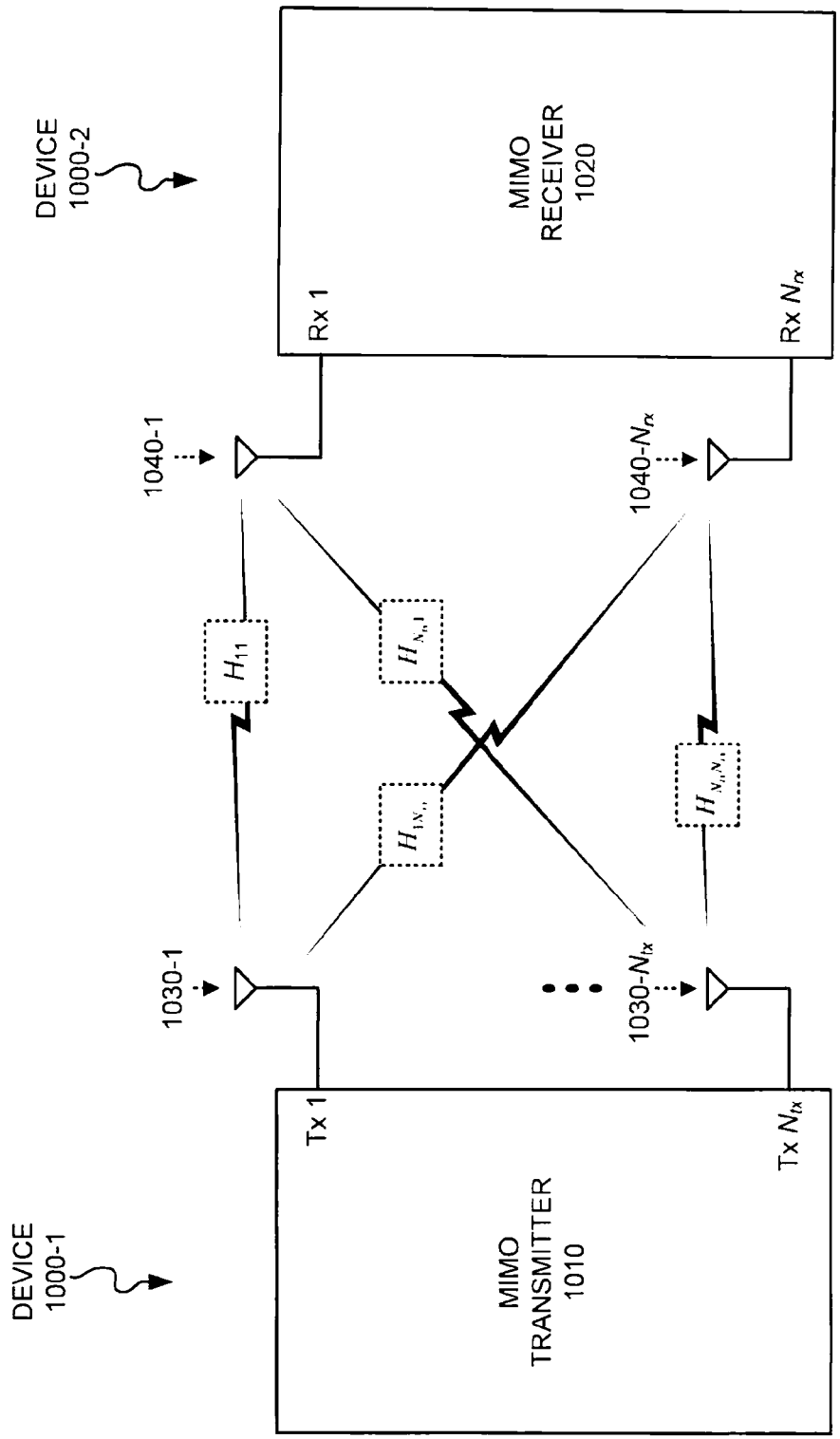
FIG. 10 illustrates exemplary channels between a transmit device and a receive device and the transmission of signals between the transmit and the receive device over the exemplary channels.
Figure 11:
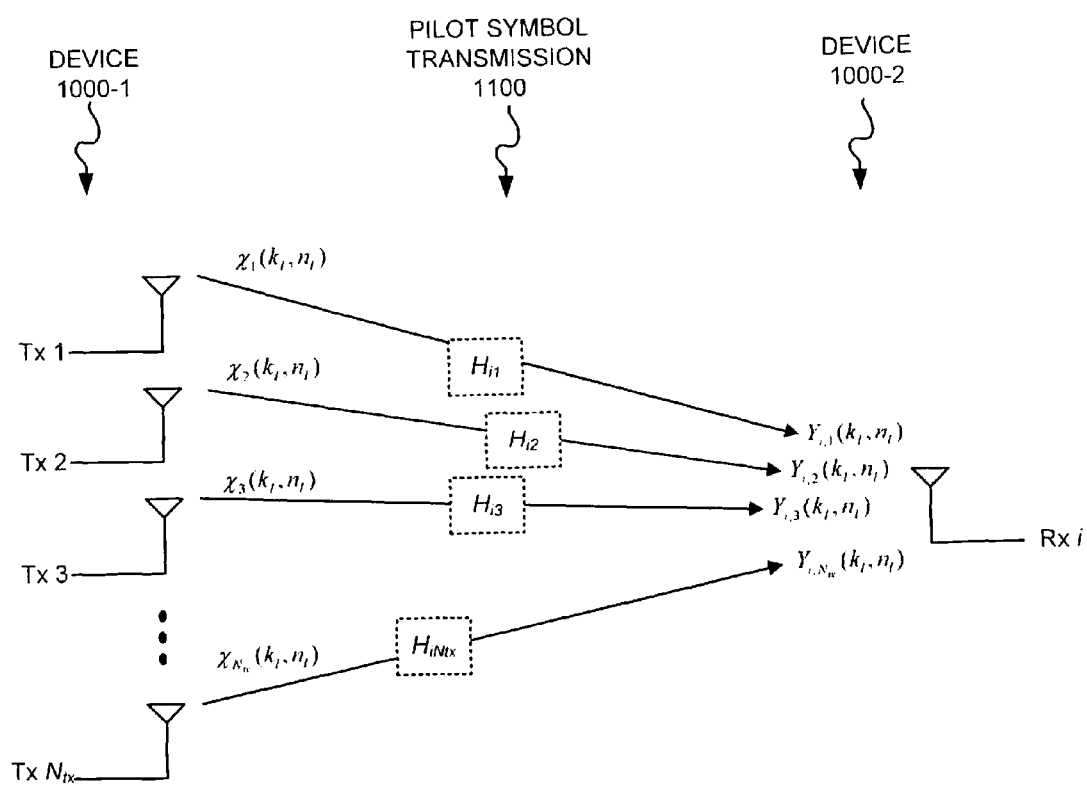
FIG. 11 depicts exemplary pilot symbol transmission between the devices of FIG. 10.
Figure 12:
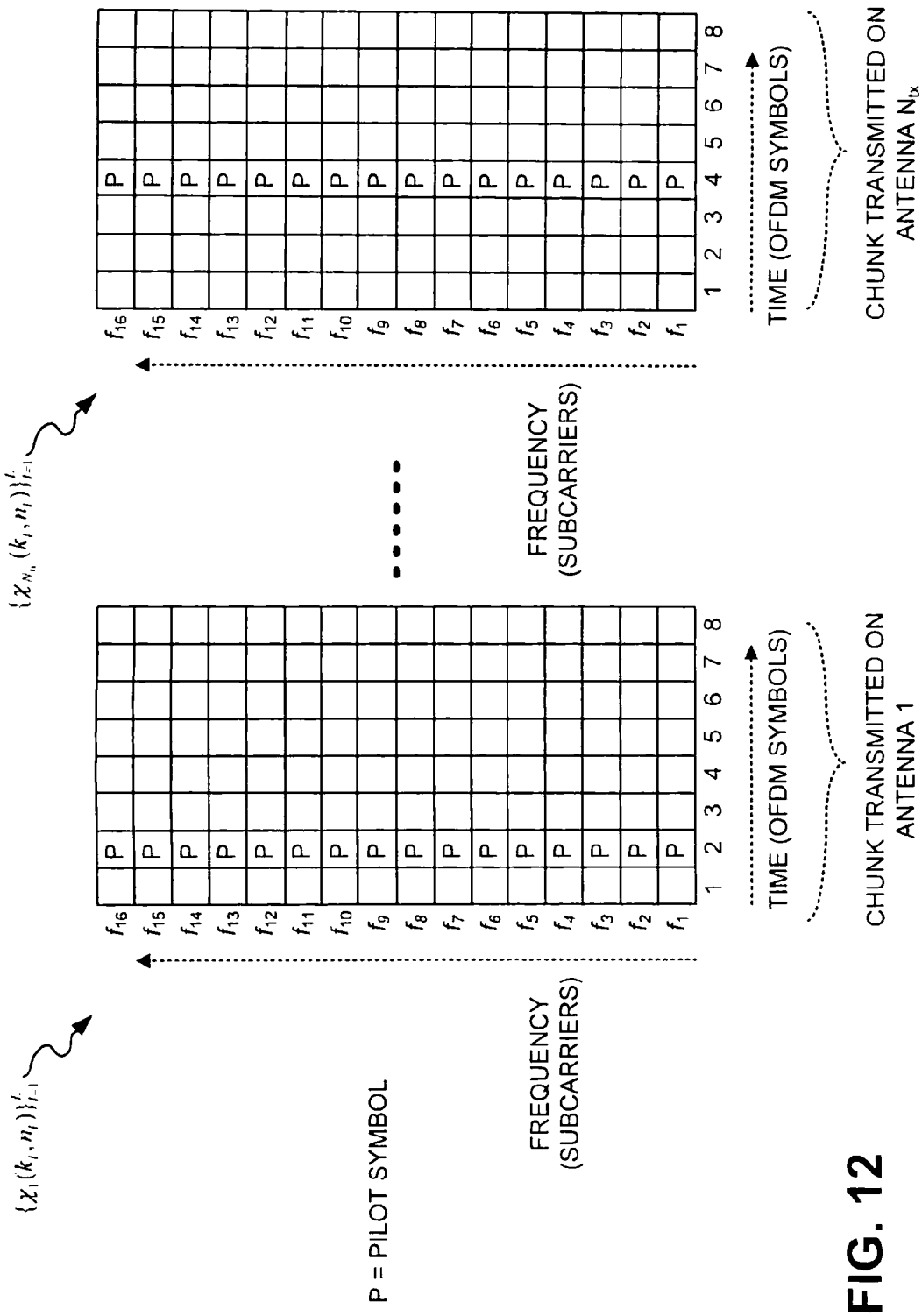
FIG. 12 depicts the transmission of "chunks" of pilot symbols from respective transmit antennas of a device of FIG. 10.

FIGS. 10-12 illustrate exemplary channels between a transmit device and a receive device and the transmission of symbols between the transmitting and receiving devices over the exemplary channels. As shown in FIG. 10, a device 1000-1 may use a MIMO transmitter 1010 and multiple associated antennas 1030-1 through 1030-N to transmit symbols, including pilot symbols, to another device 1000-2. Device 1000-1 may correspond to device 110-1 of FIG. 1A. Device 1000-2 may use a MIMO receiver 1020 and multiple associated antennas 1040-1 through 1040-N to receive the transmitted symbols. Device 1000-2 may correspond to device 110-2 of FIG. 1A. Each symbol may be transmitted across a respective channel $H_{ij}$ between a transmit antenna j 1030 to a receive antenna i 1040. For example, as shown in FIG. 10, antenna 1030-1 of MIMO transmitter 1010 may transmit symbols to antenna 1040-$N_{rx}$ of MIMO receiver 1020 via channel $H_{1N_{rx}}$. As another example, antenna 1030-$N_{tx}$ of MIMO transmitter 1010 may transmit symbols to antenna 1040-$N_{rx}$ of MIMO receiver 1020 via channel $H_{N_{tx}N_{rx}}$.

FIG. 11 further depicts pilot symbol transmission 1100 between devices 1000-1 and 1000-2. As shown in FIG. 11, a pilot symbol $\chi_1(k_l,n_l)$ may be transmitted from transmit antenna Tx 1 across channel $H_{i1}$ to be received at a receive antenna Rx i as a received signal $Y_{i1}(k_l,n_l)$. Pilot symbol $\chi_2(k_l,n_l)$ may be transmitted from transmit antenna Tx 2 across channel $H_{i2}$ to be received at receive antenna Rx i as a received signal $Y_{i2}(k_l,n_l)$. Pilot symbol $\chi_3(k_l,n_l)$ may be transmitted from transmit antenna Tx 3 across channel $H_{i3}$ to be received at receive antenna Rx i as a received signal $Y_{i3}(k_l,n_l)$. Pilot symbol $\chi_{N_{tx}}(k_l,n_l)$ may be transmitted from transmit antenna Tx $N_{tx}$ across channel $H_{iNtx}$ to be received at receive antenna Rx i as a received signal $Y_{iNtx}(k_l,n_l)$.

FIG. 12 further depicts the transmission of "chunks" of pilot symbols from respective transmit antennas of device 1000-1. For example, FIG. 12 depicts a first "chunk" of pilot symbols $\{\chi_1(k_l,n_l)\}_{l=1}^L$ transmitted from a first transmit antenna and a second "chunk" of pilot symbols $\{\chi_{N_{tx}}(k_l,n_l)\}_{l=1}^L$ transmitted from another antenna. As shown in FIG. 12, chunks $\{\chi_1(k_l,n_l)\}_{l=1}^L$ and $\{\chi_{N_{tx}}(k_l,n_l)\}_{l=1}^L$ may include L pilot symbols, with each of the L pilot symbols transmitted at a specific sub-carrier frequency (kth sub-carrier) at a specific time slot (n). For example, as shown in FIG. 12, chunk $\{\chi_1(k_l,n_l)\}_{l=1}^L$ may include 16 pilot symbols transmitted during a same time slot (e.g., time slot 2) each at a different sub-carrier frequency.

Figure 13:
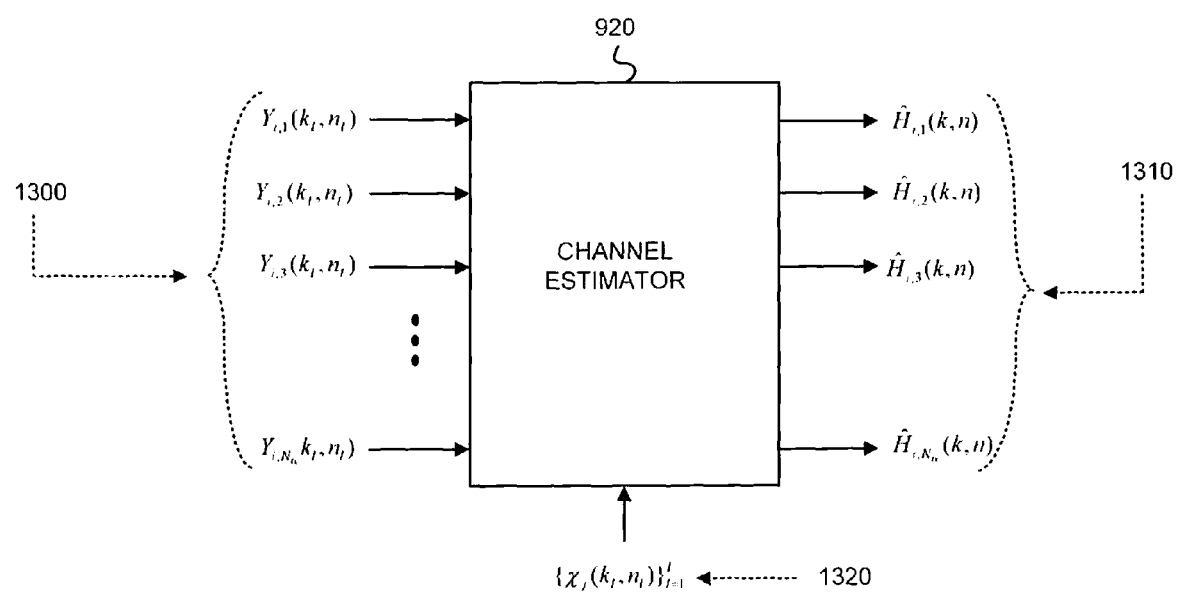
FIG. 13 illustrates channel estimation performed by the channel estimator of FIG. 9 according to an exemplary implementation.

FIG. 13 depicts exemplary channel estimation performed by channel estimator 920 according to an exemplary implementation. Channel estimator 920 receives multiple pilot symbols transmitted from multiple different antennas for estimating a channel response for a given channel in a MIMO system. Channel estimator 920 may be implemented in software, hardware, or a combination of software and hardware. In one implementation, the exemplary process of FIGS. 14A and 14B below may be implemented as a set of instructions and stored in a computer-readable medium, such as memory 315. The set of instructions may be retrieved from the computer-readable medium and executed by processing unit 310 to implement the channel estimation process. Alternatively, hardwired circuitry may be used in place of, or in combination with, software instructions to implement the exemplary process of FIGS. 14A and 14B. Thus, implementations of channel estimator 920 are not limited to any specific combination of hardware circuitry and software.

As shown in FIG. 13, multiple pilot symbols 1300 transmitted from multiple different antennas may be received and input into channel estimator 920 for determining a respective channel response for a channel $\hat{H}_{i,j}$ between transmit antenna j and receive antenna i. The multiple pilot symbols 1300 may include symbols transmitted between each transmit antenna j and each receive antenna i. For example, symbol $Y_{i,1}(k_l,n_l)$, received at antenna i, may have been transmitted by transmit antenna 1. Symbol $Y_{i,N_{tx}}(k_1,n_1)$, received at antenna i, may have been transmitted by transmit antenna $N_{tx}$. Channel estimator 920 may further have a-priori knowledge of the actual symbols 1320 $\{\chi_j(k_l,n_l)\}_{l=1}^L$ transmitted from the respective transmit antennas j. Channel estimator 920 may determine estimates of the channel responses for each channel between a respective transmit antenna j and a receive antenna i. For example, channel estimator 920 may estimate the channel response $\hat{H}_{i,1}(k,n)$ between transmit antenna 1 and receive antenna i. As another example, channel estimator 920 may estimate the channel response $\hat{H}_{i,3}(k,n)$ between transmit antenna 3 and receive antenna i.

Channel estimator 920 may estimate the MIMO channels based on the chunks of dedicated pilot symbols transmitted from a MIMO transmitter, where each chunk may be defined as a block of $N_t$ consecutive orthogonal frequency division multiplexing (OFDM) symbols (along the time axis) and $N_f$ consecutive sub-carriers (along the frequency axis). Let $\{\chi_{a}(k_l,n_l)\}_{l=1}^L$ denote the subset of elements of a chunk transmitted from transmit antenna j that are devoted to pilot symbols, where L is the number of pilot symbols that may be transmitted during each chunk from transmit antenna j. The subset of indexes $\{k_1,n_1\}_{l=1}^L$ for each transmit antenna is determined by the chosen pattern of pilot symbols in the time and frequency domain. Similarly, let $\{Y_{i,j}(k_l,n_l)\}_{l=1}^L$ denote the received symbols at the i-th receive antenna corresponding to the pilots symbols $\{\chi_j(k_l,n_l)\}_{l=1}^L$. We assume that the pilot symbols and data symbols are orthogonal at the transmit antennas. In other words, if $\chi_j(k,n)$ is a pilot symbol on the j-th antenna, then $\chi_{j_1}(k,n)=0$ for all $j_1 \neq j$. This implies that the relationship between $Y_{i,j}(k_l,n_l)$ and $\{\chi_j(k_l,n_l)\}_{l=1}^L$ can be described by the following expression:

$$Y_{i,j}(k_1,n_1) = H_{i,j}(k_1,n_1) \times \chi_j(k_1,n_1) + N_i(k_1,n_1) \quad 1 \leq l \leq L \qquad \text{Eqn. (1)}$$

where $H_{i,j}(k,n)$ is the time-varying frequency response of the channel between the j-th transmit antenna and the i-th receive antenna corresponding to the k-th sub-carrier at time n*T (T is a sampling interval) and $N_i(k,n)$ is a spatially uncorrelated white noise with variance $N_0$. A goal of channel estimation, as described herein, is to determine an estimate of the MIMO channel responses $H_{i,j}(k,n)$ based on observations of the received pilot symbols $\{Y_{i,j}(k_l,n_l)\}_{l=1}^L$ and a-priori knowledge of the transmitted pilot symbols $\{\chi_j(k_l,n_l)\}_{l=1}^L$.

An estimate $\hat{H}_{i,j}(k,n)$ of the actual channel response $H_{i,j}(k,n)$ can be expressed as:

$$\hat{H}_{i,j}(k,n) = \sum_{l=1}^L w_j(k,n;k_l,n_l) Y_{i,j}(k_l,n_l) \qquad \text{Eqn. (2)}$$

In Eqn. (2), $w_j(k,n;k_1,n_1)$ are the coefficients of the Wiener filter which may be computed as follows:

$$w_l(k,n;k_l,n_l) = \sum_{p=1}^L K_H(k,n;k_p,n_p) \chi_l(k_p,n_p) B_j^{-1}(k_p,n_p;k_l,n_l) \qquad \text{Eqn. (3)}$$

where $$K_H(k,n;k_p,n_p) = E\{H_{i,j}(k,n) H^*_{i,j}(k_p,n_p)\} \qquad \text{Eqn. (4)}$$

is the time-frequency correlation matrix of the channel $H_{i,j}(k,n)$ and $B_j^{-1}(k_p,n_p;k_l,n_l)$ are the elements of the matrix $\bar{B}_j^{-1}$ which is inverse to the matrix $\bar{B}_j$ with elements:

$$B_j(k_p,n_p;k_l,n_l) = N_0 \delta(k_p-k_l) \delta(n_p-n_l) + \chi^*_l(k_p,n_p) K_H(k_p,n_p;k_l,n_l) \chi_j(k_l,n_l) \qquad \text{Eqn. (5)}$$

A channel estimator using the algorithm of Eqn. (2), thus, consists of $N_{tx}$ independent estimators, with one estimator per each transmit antenna. Such a structure reflects the fact that the correlation matrix $K_H(k,n;k_p,n_p)$ in Eqns. (3) through (5) does not include the spatial properties of the MIMO channels. More complete statistical information in the channels $H_{i,j}(k,n)$ can be described by a spatial-time-frequency correlation matrix represented by:

$$K_H(k_p,n_p,k_l,n_l;j,j_2) = E\{H_{i,j}(k_p,n_p) H^*_{i,j_2}(k_l,n_l)\} \qquad \text{Eqn. (6)}$$

This spatial-time-frequency correlation matrix contains information about spatial correlation between channels $H_{i,j}(k_p,n_p)$ and $H_{i,j_1}(k_l,n_l)$ corresponding to the j-th and $j_1$-th transmit antennas. For spatially uncorrelated channels, the spatial-time-frequency correlation matrix can be expressed as:

$$K_H(k_p,n_p,k_l,n_l;j,j_1) = K_H(k_p,n_p,k_l,n_l) \delta(j-j_1) \qquad \text{Eqn. (7)}$$

Eqn (7) implies that the channel estimation algorithm of Eqn. (2) has been synthesized under an assumption that the MIMO channels corresponding to the different transmit antennas are spatially uncorrelated. However, the spatial correlation between the MIMO channels can be high in certain circumstances. For example, for MIMO systems with beamforming (e.g., a spatial division multiple access (SDMA) MIMO system), the distance between transmit antennas is small (0.5λ, where λ is the wavelength). Thus, in MIMO systems with beamforming, the MIMO channels may be highly correlated. Channel estimation may, therefore, be improved by taking into account the spatial properties of the MIMO channels.

Enhanced channel estimation, as described herein, may, in some implementations, be based on the spatial-time-frequency correlation matrix (e.g., Eqn. (6)) of the MIMO channels. This enhanced channel estimation may estimate the channel response of the channel $H_{i,j}(k,n)$ based on joint observation of all pilots $\bar{\chi}(k_l,n_l)=\{\chi_1(k_l,n_l)\}$ and receive signals $\bar{Y}_i(k_l,n_l)=\{Y_{i,1}(k_l,n_l),\ldots,Y_{i,N_{tx}}(k_l,n_l)\}$. The proposed channel estimation algorithm can be expressed as:

$$\hat{H}_{i,j}(k,n) = \sum_{j_1=1}^{N_{tx}} \sum_{l=1}^{L} W_{j,j_1}(k,n;k_l,n_l) Y_{i,j_1}(k_l,n_l) \quad \text{Eqn. (8)}$$

where coefficients $W_{j,s}(k,n;k_l,n_l)$ may be determined as follows:

$$W_{j,j_1}(k,n;k_l,n_l) = \quad \text{Eqn. (9)}$$
$$\sum_{l_2=1}^{N_{tx}} \sum_{p=1}^{L} K_H(k,n;k_p,n_p;j,j_2)\chi_j(k_p,n_p) A_{j_1,j_2}^{-1}(k_p,n_p;k_l,n_l)$$

where $A_{j_1,j_2}^{-1}(k_p,n_p;k_l,n_l)$ are the elements of the matrix $\bar{A}^{-1}$ which is inverse to the matrix $\bar{A}$ with elements:

$$A_{j_1,j_2}(k_p,n_p;k_l,n_l)=N_0\delta(k_p-k_l)\delta(n_p-n_l)\delta(j_1-j_2)+\chi^*_{j_1}(k_p,n_p)K_H(k_p,n_p;k_l,n_l;j_1,j_2)\chi_{j_2}(k_p,n_p) \quad \text{Eqn. (10)}$$

for $1 \le j_2 \le N_{tx}$ and $1 \le p \le L$.

where $\delta(k_p-k_l)$, $\delta(n_p-n_l)$, and $\delta(j_1-j_2)$ are the Kronecker delta function, which is defined as $\delta(x)=1$ if $x=0$, and $\delta(x)=0$ if $x\ne 0$. and where $K_H(k,n,k_p,n_p; j,j_2)$ is the spatial-time-frequency correlation matrix of Eqn. (6). The spatial-time-frequency correlation matrix $K_H(k,n,k_p,n_p; j,j_2)$ may, in one exemplary implementation, be determined by the following:

$$K_H(k,n,k_p,n_p;j,j_2)E\{H_{i,j}(k,n)H^*_{i,j_2}(k_p,n_p)\}=\rho(n_p-n)\times Q(k_p-k)\times R(j,j_2) \quad \text{Eqn. (11)}$$

where $$\rho(n) = J_o\left(\frac{2\pi f_c v n T}{c}\right), \quad \text{Eqn. (12)}$$

where $$Q(k) = \sum_{m=0}^{M} \sigma_m^2 \exp\left(-j\frac{2\pi}{N}mk\right), \quad \text{Eqn. (13)}$$

and where $$R(j,j_2) = \frac{\sin\frac{2\pi f_c d(j,j_2)}{c}}{\frac{2\pi f_c d(j,j_2)}{c}} \quad \text{Eqn. (14)}$$

for $1 \le j_2 \le N_{tx}$ and $1 \le p \le L$, where
  $J_0$ is the Bessel function of zero order;
  $f_c$ is a carrier frequency;
  v is a velocity associated with the MIMO receiver;
  T is a sampling interval;
  $\sigma^2_m$ is the power delay profile of the MIMO channels;
  N is a size of DFT 910 of the receiver;
  $d(j,j_2)$ is the distance between transmit antenna j and transmit antenna $j_2$;
  c is the speed of light;
  ρ is the correlation of the channel in the time domain;
  Q is the correlation of the channel in the frequency domain; and
  $R(j,j_2)$ is the correlation of the channel in the space domain.

It is noted that the correlation matrix determined by Eqn. (11) merely represents one example of different correlation matrices that may be used in Eqns. (8) and (9) to determine a channel estimate. Other correlation matrices, that take into account the spatial properties of the MIMO channels, may be used instead of, in conjunction with, or in addition to, the correlation matrix of Eqn. (11). As an example, a recursive procedure may be used to obtain an estimate of matrix $K_H$ in Eqn. (9). This recursive procedure may include obtaining an initial estimate of $K_H(k_p,n_p,k_l,n_l;j,j_2)$ which can be denoted as $\hat{K}_H^{(m-1)}(k_p,n_p,k_l,n_l;j,j_2)$. This estimate $\hat{K}_H^{(m-1)}(k_p,n_p,k_l,n_l;j,j_2)$ can be used to compute the Wiener filter coefficients according to Eqn. (9), and then these Weiner filter coefficients may be used to obtain an estimate of the channel according to Eqn. (8), where the estimate of the channel is denoted $\hat{H}_{i,j}^{(m-1)}(k,n)$. Using the fact that the channel is stationary in time and frequency, the following expression can be used to obtain a new estimate $\hat{K}_H^{(m)}(k_p,n_p,k_l,n_l;j,j_2)$ using $\hat{H}_{i,j}^{(m-1)}(k,n)$:

$$\hat{K}_H^{(m)}(k_p,n_p;k_l,n_l;j,j_2) = \quad \text{Eqn. (15)}$$
$$\frac{1}{N_f N_t} \sum_{k=1}^{N_f} \sum_{n=1}^{N_t} \hat{H}_{i,j}^{(m-1)}(k,n) \hat{H}_{i,j_2}^{(m-1)*}(k+\delta k, n+\delta n)$$

where $\delta k = k_l - k_p$ and $\delta n = n_l - n_p$. The estimate $\hat{K}_H^{(m)}$ may then be used to re-compute the Weiner filter coefficients according to Eqn. (9) and then the new Weiner filter coefficients and Eqn. (15) may be used to obtain a new estimate of $\hat{K}_H^{(m+1)}$. This process may be iteratively repeated such that Eqn. (15) performs a long-term averaging of the channel estimates over $N_f$ frequencies and $N_t$ time samples.

Using the channel estimation algorithm of Eqn. (8), channel estimator 920 takes into account all of pilot symbols 1100 transmitted from the transmit antennas when estimating a channel response for each individual channel. When the MIMO channels are spatially uncorrelated (see Eqn. (2) above), the matrix $\bar{W}$ with elements $W_{j,s}(k,n;k_l,n_l)$ become diagonal and the algorithm of Eqn. (8) transforms to the algorithm of Eqn. (2).

Figure 14A:
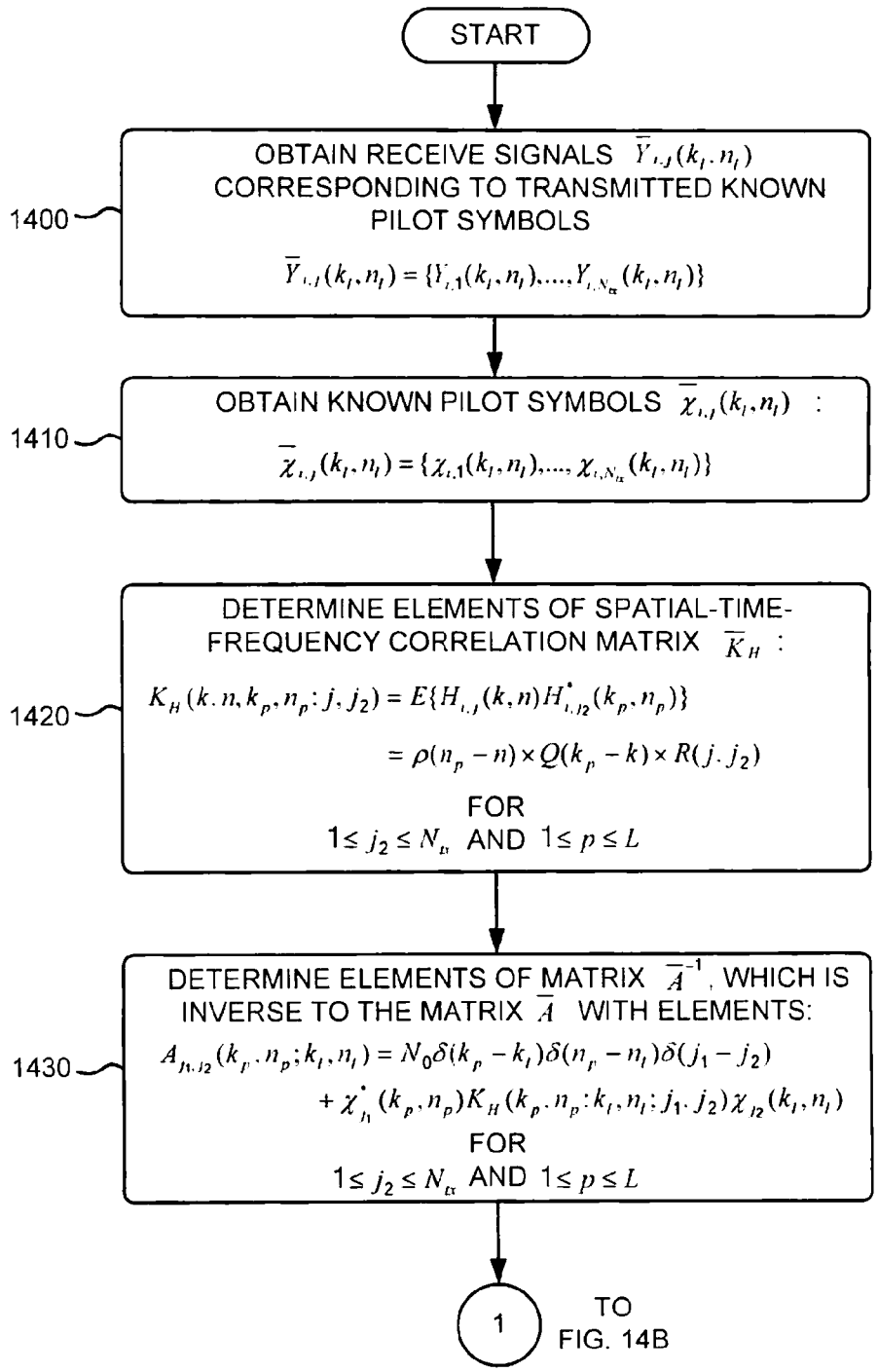
FIGS. 14A and 14B are flowcharts of an exemplary process for estimating channel responses of MIMO channels.
Figure 14B:
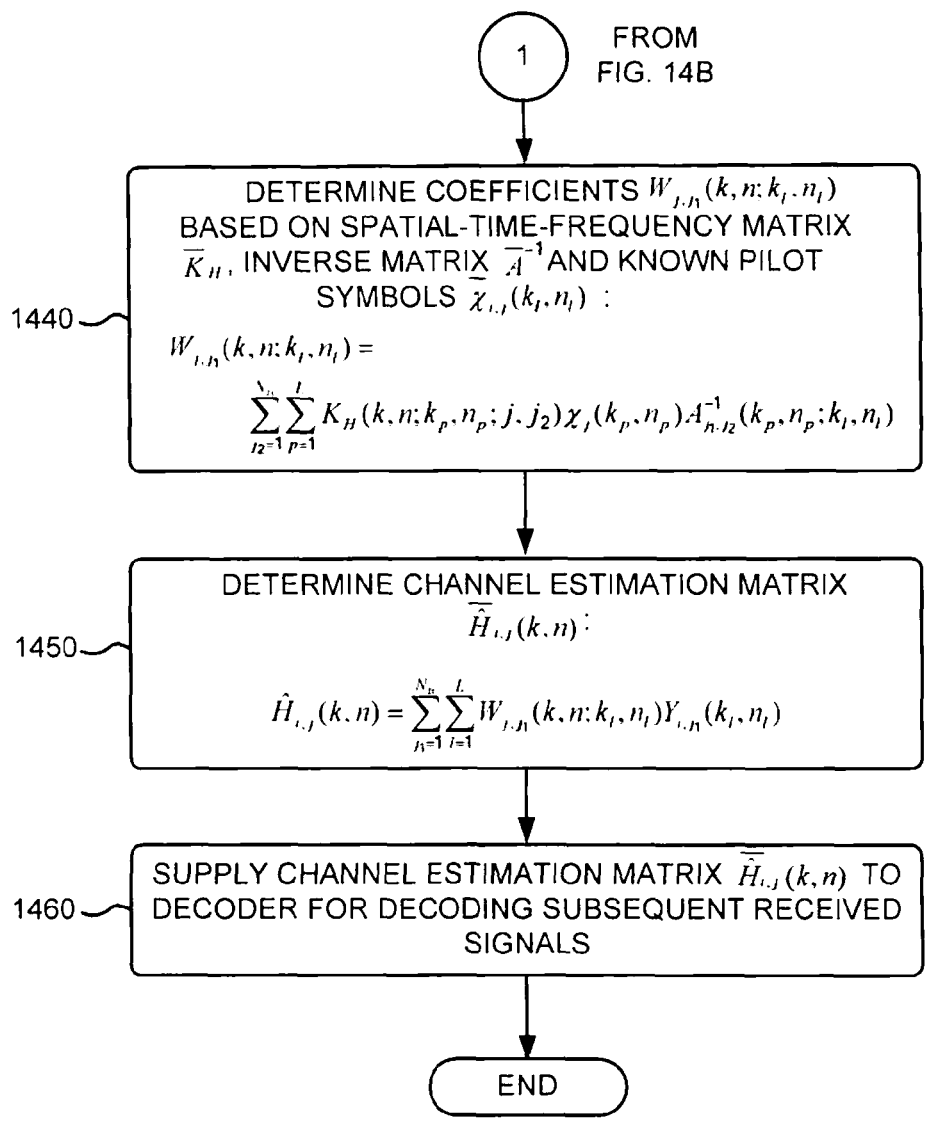

FIGS. 14A and 14B are flowcharts of an exemplary process for estimating channel responses of MIMO channels. The process exemplified by FIGS. 14A and 14B may be implemented by channel estimator 920 corresponding to a receive antenna i.

The exemplary process may begin with channel estimator 920 obtaining receive signals $\overline{Y}_{i,j}(k_l,n_l)=\{Y_{i,1}(k_l,n_l), \ldots, Y_{i,N_{rx}}(k_l,n_l)\}$ that correspond to transmitted known pilot symbols (block 1400). MIMO receiver 510 may receive the receive signals $\overline{Y}_{i,j}(k_l,n_l)=\{Y_{i,1}(k_l,n_l), \ldots, Y_{i,N_{rx}}(k_l,n_l)\}$ which may constitute distorted versions of the originally transmitted pilot symbols due to the effect of the channel response and these receive signals may be supplied to channel estimator 920.

Channel estimator 920 may also obtain the known pilot symbols $\overline{\chi}_{i,j}(k_l,n_l)=\{\chi_{i,1}(k_l,n_l), \ldots, \chi_{i,N_{rx}}(k_l,n_l)\}$ (block 1410). The known pilot symbols may be previously stored in memory in association with MIMO receiver 510 for retrieval and use by channel estimator 920. Channel estimator 920 may determine elements of the spatial-time-frequency correlation matrix $\overline{K}_H$ of, for example, Eqns. 11-14 (block 1420):

$$K_H(k, n, k_p, n_p; j, j_2) = E\{H_{i,j}(k, n)H^*_{i,j_2}(k_p, n_p)\}$$
$$= \rho(n_p - n) \times Q(k_p - k) \times R(j, j_2)$$

where $$\rho(n) = J_o\left(\frac{2\pi f_c v n T}{c}\right),$$

$$Q(k) = \sum_{m=0}^{M} \sigma_m^2 \exp\left(-j\frac{2\pi}{N}mk\right) \text{ and } R(j, j_2) = \frac{\sin\frac{2\pi f_c d(j, j_2)}{c}}{\frac{2\pi f_c d(j, j_2)}{c}},$$

for $1 \leq j_2 \leq N_{tx}$ and $1 \leq p \leq L$

Other correlation matrices (as described above) may be used in conjunction with, as an alternative to, or in addition to the spatial-time frequency matrix of Eqns. 11-14 for estimating the channel response.

Channel estimator 920 may determine elements of matrix $\overline{A}^{-1}$, which is inverse to the matrix $\overline{A}$ with elements according to the expression of Eqn. 10 (block 1430):

$$A_{j_1,j_2}(k_p,n_p;k_l,n_l)=N_0\delta(k_p-k_l)\delta(n_p-n_l)\delta(j_1-j_2)+\chi^*_{j_1}(k_p,n_p)K_H(k_p,n_p;k_l,n_l;j_1,j_2)\chi_{j_2}(k_l,n_l)$$

for $1 \leq j_2 \leq N_{tx}$ and $1 \leq p \leq L$

Channel estimator 920 may determine matrix coefficients $W_{j,j_1}(k,n;k_l,n_l)$ based on the spatial-time-frequency matrix $\overline{K}_H$, inverse matrix $\overline{A}^{-1}$, and known pilot symbols $\overline{\chi}_{i,j}(k_l,n_l)$ according to the expression of Eqn. 9 (block 1440):

$$W_{j,j_1}(k, n; k_l, n_l) = \sum_{j_2=1}^{N_{tx}} \sum_{p=1}^{L} K_H(k, n: k_p, n_p; j, j_2)\chi_j(k_p, n_p)A^{-1}_{j_1,j_2}(k_p, n_p; k_l, n_l)$$

for $1 \leq j_2 \leq N_{tx}$ and $1 \leq p \leq L$

Channel estimator 920 may determine the channel estimation matrix $\overline{H}_{i,j}(k,n)$ according to the expression of Eqn. 8 (block 1450):

$$\hat{H}_{i,j}(k, n) = \sum_{j_1=1}^{N_{tx}} \sum_{l=1}^{L} W_{j,j_1}(k, n; k_l, n_l)Y_{i,j_1}(k_l, n_l)$$

Channel estimator 920 may supply the determined channel estimation matrix $\overline{H}_{i,j}(k,n)$ to decoder 930 for decoding subsequent received symbols (block 1460).

Channel Estimation Performance Evaluation

Figure 15:
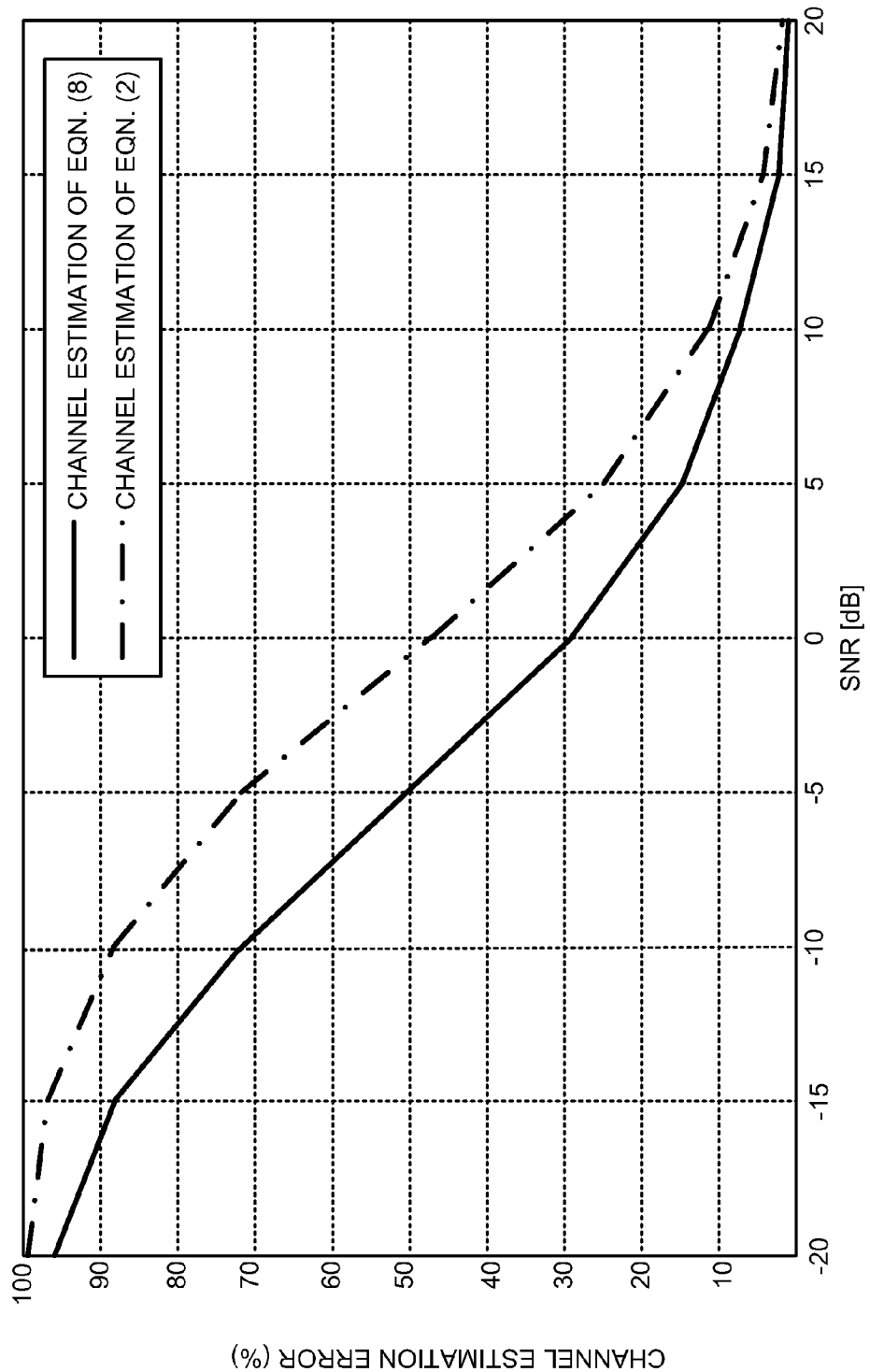
FIGS. 15 and 16 illustrate a simulated performance of the channel estimator of FIG. 9.
Figure 16:
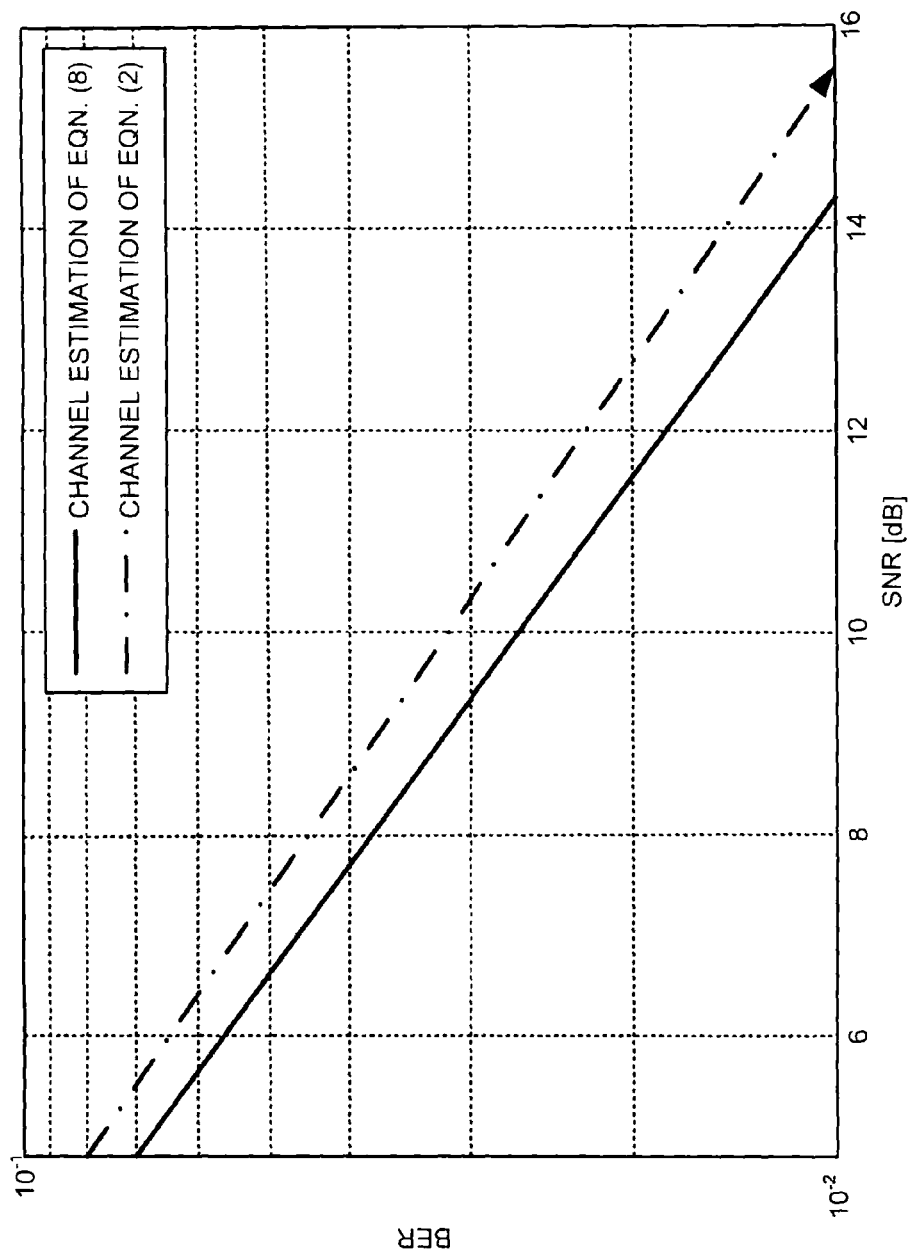

FIGS. 15 and 16 depict simulated channel estimation performance associated with the channel estimation algorithms of Eqns. (2) and (8). Assumptions and parameters associated with the simulated channel estimation performance shown in FIGS. 15 and 16 includes the following:

1) Base station has $N_{tx}=4$ transmit antennas and the receiving device (e.g., cellular radiotelephone) has $N_{rx}=2$ receive antennas. This results in 4×2 MIMO channels between the base station and the receiving device;
2) The transmit antennas are placed close to each other (e.g., $\lambda/2$ spacing) and are highly correlated. Such a configuration might be found in a long term evolution (LTE) cellular system with SDMA;
3) The downlink MIMO channels are modeled as random realizations of the dispersive $3^{rd}$ Generation Partnership Project (3GPP) Typical Urban channel from the 3GPP Spatial Channel Model;
4) A chunk is defined as a block of 10 consecutive OFDM symbols (along the time axis) and 12 consecutive sub-carrier (along the frequency axis) with 15 kHz separation between sub-carriers;
5) Each transmit antenna transmits 4 pilots per chunk with double power; and
6) 16 Quadrature Amplitude Modulation (QAM) is used.

FIG. 15 depicts the channel estimation error plotted as a function of the signal-to-noise power ratio SNR at the receiving device. It is apparent from FIG. 15, that at the low to moderate SNR region, the channel estimation algorithm of Eqn. (8) gains 5 dB as compared to the channel estimation algorithm of Eqn. (2). FIG. 16 further shows bit error rate (BER) corresponding to the channel estimation algorithms of Eqns. (8) and (2). As is evident from FIG. 16, with 16QAM modulation at BER=1%, the channel estimation algorithm of Eqn. (8) outperforms the channel estimation algorithm of Eqn. (2) by 1.5 dB.

CONCLUSION

The foregoing description of implementations provides illustration and description, but is not intended to be exhaustive or to limit the invention to the precise form disclosed. Modifications and variations are possible in light of the above teachings, or may be acquired from practice of the invention. For example, while series of blocks have been described with regard to FIGS. 14A and 14B, the order of the blocks may be modified in other implementations consistent with the principles of the invention. Further, non-dependent blocks may be performed in parallel Aspects of the invention may also be implemented in methods and/or computer program products. Accordingly, the invention may be embodied in hardware and/or in software (including firmware, resident software, microcode, etc.). Furthermore, the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with principles of the invention is not limiting of the invention. Thus, the operation and behavior of the aspects were described without reference to the specific software code—it being understood that one of ordinary skill in the art would be able to design software and control hardware to implement the aspects based on the description herein.

Furthermore, certain portions of the invention may be implemented as "logic" that performs one or more functions. This logic may include hardware, such as an application specific integrated circuit or field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. An apparatus for estimating a channel response associated with a multiple input/multiple output (MIMO) system, said apparatus comprising:
    an antenna configured to receive a plurality of pilot symbols, each of the plurality of pilot symbols transmitted from a different one of multiple transmit antennas of a transmitter in the MIMO system; and
    a channel estimator configured to determine spatial, time and frequency correlations of channels of the MIMO system among the multiple transmit antennas, when estimating a channel response associated with the MIMO system based on multiple ones of the received plurality of pilot symbols by,
        estimating one of the spatial, time and frequency correlations of the channels of the MIMO system among the multiple transmit antennas;
        estimating a first channel response based on the estimated one of the spatial, time and frequency correlations;
        re-estimating the one of the spatial, time and frequency correlations of the channels of the MIMO system based on the first channel response; and
        re-estimating the first channel response to produce a second channel response.

2. The apparatus of claim 1, where the apparatus is implemented in a mobile terminal.

3. The apparatus of claim 1, where the apparatus is implemented in a base station of a wireless network.

4. The apparatus of claim 1, where the channel estimator is further configured to determine the correlations of the channels of the MIMO system in a spatial, time and frequency domain.

5. The apparatus of claim 4, where the channel estimator is further configured to:
    determine first correlations of the channels of the MIMO system in the time domain;
    determine second correlations of the channels of the MIMO system in the frequency domain;
    determine third correlations of the channels of the MIMO system in the spatial domain; and
    determine the spatial time and frequency correlations of the channels of the MIMO system based on the first correlations, second correlations and third correlations.

6. The apparatus of claim 5, where the third correlations in the spatial domain take into account distances between the multiple transmit antennas.

7. The apparatus of claim 1, where the multiple ones of the received plurality of pilot symbols comprise all of the received plurality of pilot symbols.

8. The apparatus of claim 1, where the channel estimator is further configured to determine Weiner filter coefficients based on the determined spatial, time and frequency correlations of the channels of the MIMO system.

9. The apparatus of claim 8, where the channel estimator is further configured to estimate the channel response based on the Weiner filter coefficients.

10. A method for estimating a channel response associated with a multiple input/multiple output (MIMO) system, said method comprising:
    receiving a plurality of pilot symbols at a receiver, each of the plurality of pilot symbols transmitted from a different one of multiple transmit antennas of a transmitter in the MIMO system; and
    determining spatial, time and frequency correlations of channels of the MIMO system among the multiple transmit antennas by:
        estimating one of the spatial, time and frequency correlations of the channels of the MIMO system;
        estimating a first channel response associated with a first channel of the MIMO system based on the spatial, time and frequency correlations and multiple ones of the received plurality of pilot symbols;
        re-estimating the one of the spatial, time and frequency correlations of the channels of the MIMO system based on the first channel response; and
        re-estimating the first channel response to produce a second channel response associated with the first channel.

11. The method of claim 10, further comprising using the estimated first channel response for decoding subsequent symbols received via the first channel at an antenna of the receiver.

12. The method of claim 10, where the method is implemented in a mobile terminal.

13. The method of claim 10, where the method is implemented in a base station of a cellular network.

14. The method of claim 10, further comprising determining the correlations of the channels of the MIMO system in a spatial, time and frequency domain.

15. The method of claim 14, where determining the spatial, time and frequency domain correlations of the channels of the MIMO system comprises:
    determining first correlations of the channels of the MIMO system in the time domain;
    determining second correlations of the channels of the MIMO system in the frequency domain;
    determining third correlations of the channels of the MIMO system in the spatial domain; and determining the spatial, time and frequency correlations of the channels of the MIMO system based on the first correlations, second correlations and third correlations.

16. The method of claim 15, where the third correlations in the spatial domain take into account distances between the multiple transmit antennas.

17. The method of claim 10, where the multiple ones of the received plurality of pilot symbols comprise all of the received plurality of pilot symbols.

18. The method of claim 10, further comprising determining Weiner filter coefficients based on the determined spatial, time and frequency correlations of the channels of the MIMO system.

19. The method of claim 18, where estimating the first channel response is further based on the Weiner filter coefficients.

20. The method of claim 10, further comprising estimating a second channel response associated with a second channel of the MIMO system based on the spatial, time and frequency correlations and multiple ones of the received plurality of pilot symbols.

21. A channel estimator arrangement implemented in a mobile terminal or a base station of a wireless network, for estimating channel responses associated with channels of a multiple input/multiple output (MIMO) system, said channel estimator arrangement comprising:

an antenna for receiving a plurality of pilot symbols, each of the plurality of pilot symbols transmitted from a different one of multiple transmit antennas of a transmitter in a multiple input/multiple output (MIMO) system; and a channel estimator configured to:

determine spatial, time and frequency correlations of channels of the MIMO system among the multiple transmit antennas by:

estimate estimating one of spatial, time and frequency correlations of channels of the MIMO system among the multiple transmit antennas;

estimating a channel response associated with a first channel of the MIMO system based on multiple ones of the received plurality of pilot symbols and the estimated one of the spatial, time and frequency correlations;

re-estimating the one of the spatial, time and frequency correlations of the channels of the MIMO system based on the first channel response associated with the first channel; and estimating a channel response associated with a second channel of the MIMO system based on multiple ones of the received plurality of pilot symbols and the re-estimated one of the spatial, time and frequency correlations.

22. A method implemented in a mobile terminal or a base station of a wireless network, for estimating a channel response associated with a first channel of a multiple input/multiple output (MIMO) system, said method comprising:

receiving a plurality of pilot symbols at an antenna of a receiver, each of the plurality of pilot symbols transmitted from a different one of multiple transmit antennas of a transmitter in the MIMO system;

obtaining distances between each of the transmit antennas of the multiple transmit antennas;

determining spatial, time and frequency correlations of channels of the MIMO system among the multiple transmit antennas by:

estimating one of spatial, time and frequency correlations of channels of the MIMO system;

estimating the channel response based on the determined distances and on multiple ones of the received plurality of pilot symbols and the estimated one of the spatial, time and frequency correlations;

re-estimating the one of the spatial, time and frequency correlations of the channels of the MIMO system based on the estimated channel response;

re-estimating the channel response based on the re-estimated one of the spatial, time and frequency correlations; and using the re-estimated channel response for decoding subsequent symbols received via the first channel at the antenna.

* * * * *

UNITED STATES PATENT AND TRADEMARK OFFICE
CERTIFICATE OF CORRECTION

PATENT NO. : 8,432,993 B2
APPLICATION NO. : 12/810360
DATED : April 30, 2013
INVENTOR(S) : Zangi et al.

It is certified that error appears in the above-identified patent and that said Letters Patent is hereby corrected as shown below:

In the Drawings

In Fig. 2, Sheet 3 of 19, insert main designator -- 200 --.

In Fig. 13, Sheet 15 of 19, delete " $Y_{i,N_{tx}} k_{l},n_{l})$ " and insert -- $Y_{i,N_{tx}}(k_{l},n_{l})$ --, therefor.

In Fig. 14B, Sheet 17 of 19, delete " FROM FIG. 14B " and insert -- FROM FIG. 14A --, therefor.

In the Specification

In Column 4, Line 63, delete "output device(s) 350" and insert -- output device(s) 325 --, therefor.

In Column 6, Line 52, delete "1030-N" and insert -- $1030\text{-}N_{tx}$ --, therefor.

In Column 6, Line 56, delete "1040-N" and insert -- $1040\text{-}N_{rx}$ --, therefor.

In Column 7, Line 50, delete " $Y_{i,N_{tx}} k_{1},n_{1})$ " and insert -- $Y_{i,N_{tx}}(k_{l},n_{l})$, --, therefor.

In Column 8, Line 4, delete " $\{k_{1},n_{1}\}_{l=1}^{L}$ " and insert -- $\{k_{l},n_{l}\}_{l=1}^{L}$ --, therefor.

Signed and Sealed this
Second Day of September, 2014

Michelle K. Lee
*Deputy Director of the United States Patent and Trademark Office*

CERTIFICATE OF CORRECTION (continued)
U.S. Pat. No. 8,432,993 B2

In Column 8, Line 14, in Eqn. (1), delete "$Y_{i,j}(k_1,n_1)=H_{i,j}(k_1,n_1)\times\chi_j(k_1,n_1)+N_i(k_1,n_1)$" and insert -- $Y_{i,j}(k_l,n_l)=H_{i,j}(k_l,n_l)\times\chi_j(k_l,n_l)+N_i(k_l,n_l)$ --, therefor.

In Column 8, Line 32, delete "$w_j(k,n;k_1,n_1)$" and insert -- $w_j(k,n;k_l,n_l)$ --, therefor.

In Column 8, Line 37, in Eqn. (3), delete "$w_l(k,n;k_l,n_l)$" and insert -- $w_j(k,n;k_l,n_l)$ --, therefor.

In Column 9, Line 17, delete "$\overline{\chi}(k_l,n_l)-\{\chi_1(k_l,n_l)\}$" and insert -- $\overline{\chi}(k_l,n_l)=\{\chi_1(k_l,n_l),\ldots,\chi_{N_{tx}}(k_l,n_l)\}$ --, therefor.

In Column 9, Line 18, delete "$\{Y_{i,j}(k_l,n_l),$" and insert -- $\{Y_{i,1}(k_l,n_l),$ --, therefor.

In Column 9, Line 26, delete "$W_{j,s}(k,n;k_l,n_l)$" and insert -- $W_{j,jl}(k,n;k_l,n_l)$ --, therefor.

In Column 9, Line 42, delete "$1\leq p\leq L.$" and insert -- $1\leq p\leq L,$ --, therefor.

In Column 9, Line 44, delete "$X\neq 0.$" and insert -- $X\neq 0,$ --, therefor.

In Column 10, Line 11, delete "$J_0$" and insert -- $J_o$ --, therefor.

In Column 10, Lines 39-40, delete "$\hat{\Pi}_{i,j}^{(m-1)}(k,n).$" and insert -- $\hat{\Pi}_{i,j}^{(m-1)}(k,n).$ --, therefor.

In Column 10, Line 63, delete "$W_{j,s}(k,n;k_l,n_l)$" and insert -- $W_{j,jl}(k,n;k_l,n_l)$ --, therefor.

In Column 11, Lines 60-61, delete "$\sum_{j_2=1}^{N_{rx}}$" and insert -- $\sum_{j_2=1}^{N_{rx}}$ --, therefor.

In Column 12, Lines 3-4, delete "$\sum_{j_1=1}^{N_{rx}}$" and insert -- $\sum_{j_1=1}^{N_{rx}}$ --, therefor.

In the Claims

In Column 13, Line 48, in Claim 1, delete "by," and insert -- by: --, therefor.

In Column 15, Line 36, in Claim 21, delete "estimate estimating" and insert -- estimating --, therefor.